US007306246B2

(12) United States Patent
Gale

(10) Patent No.: US 7,306,246 B2
(45) Date of Patent: Dec. 11, 2007

(54) HIGHLY COLLAPSIBLE AMBULATORY ASSISTIVE WALKER APPARATUS

(76) Inventor: Bradley D. Gale, 2731 Ridgeway Ave., Rochester, NY (US) 14626

( * ) Notice: Subject to any disclaimer, the term of this patent is extended or adjusted under 35 U.S.C. 154(b) by 193 days.

(21) Appl. No.: 11/335,896

(22) Filed: Jan. 19, 2006

(65) Prior Publication Data

US 2007/0163633 A1 Jul. 19, 2007

(51) Int. Cl.
*B62B 7/06* (2006.01)

(52) U.S. Cl. .............................. 280/87.05; 280/47.34; 280/642; 280/647

(58) Field of Classification Search ............ 280/47.34, 280/47.38, 47.4, 47.11, 87.05, 87.041, 651, 280/639, 642, 649, 650, 647, 657, 658
See application file for complete search history.

(56) References Cited

U.S. PATENT DOCUMENTS

| | | | | |
|---|---|---|---|---|
| 4,867,438 | A * | 9/1989 | Steckert et al. | 482/68 |
| 4,907,794 | A | 3/1990 | Rose | |
| 5,538,268 | A * | 7/1996 | Miller | 280/87.5 |
| 5,887,887 | A | 3/1999 | Keuning | |
| 6,099,002 | A * | 8/2000 | Uchiyama | 280/87.21 |
| 6,311,708 | B1 * | 11/2001 | Howle | 135/67 |
| 6,367,823 | B1 * | 4/2002 | Miyagi | 280/47.34 |
| 6,651,994 | B2 * | 11/2003 | Hallgrimsson et al. | 280/87.41 |
| 6,688,633 | B2 | 2/2004 | van't Schip | |
| 7,108,004 | B2 * | 9/2006 | Cowie et al. | 135/74 |

* cited by examiner

*Primary Examiner*—Christopher P. Ellis
*Assistant Examiner*—John D Walters
(74) *Attorney, Agent, or Firm*—Patent Innovations LLC; John M. Hammond

(57) ABSTRACT

A walker apparatus comprised of a first front support leg assembly, a second front support leg assembly, a first sliding joint, a second sliding joint, a central hinge joint, a first rear support leg assembly, a second rear support leg assembly, a first support member, a second support member, a front leg collapsing assembly, and a rear leg collapsing assembly. The walker apparatus is adapted to be is collapsed to a compact shape in a continuous collapsing motion.

20 Claims, 21 Drawing Sheets

HIGHLY COLLAPSIBLE AMBULATORY ASSISTIVE WALKER APPARATUS

This invention relates in one embodiment to an walker apparatus, and more particularly to a highly accessorized walker apparatus that is collapsible to a compact shape in a continuous collapsing motion.

BACKGROUND OF THE INVENTION

1. Field of the Invention

A collapsible walker apparatus for providing ambulatory assistance to a person having otherwise limited mobility.

2. Description of Related Art

There are many different types of apparatus used to provide ambulatory assistance to the elderly and the infirm. One type of apparatus, known generally as a walker, is used by a person standing in an upright (walking) position to provide assistance in walking, or otherwise moving carefully in forward, backward, or sideways directions. Typically, a walker includes a four-legged frame support, and support bars which the user grips with his/her hands as he/she uses the device for walking support.

For some time now, walkers in various configurations have been made so that they can be collapsed from the open state to a more compact collapsed shape that is more portable within confined spaces, such as e.g., the interior of a vehicle. The collapsing of such walkers is often a complex multi-step process: various components of the particular collapsible walker must be individually collapsed and/or retracted. This collapsing often entails the loosening of various fasteners, and the subsequent retightening of such fasteners when the walker or its subcomponent is collapsed.

Heretofore, a number of patents and publications have disclosed collapsible walker apparatus. The relevant portions of several examples of these patents may be briefly summarized as follows:

U.S. Pat. No. 4,907,794 to Rose, issued Mar. 13, 1990, describes "a foldable rolling walker having a high crossbar for easier walking convenience, height adjustable handles centered over offset wheels for greater stability, lockable pivoting front wheels and reversible brakes. The overall design is compact, lightweight and very stable. The walker includes a seat removably mounted between the side frames of the walker by collar clamps secured to the frame of the walker." The disclosure of this United States patent is incorporated herein by reference.

U.S. Pat. No. 5,887,887 to Keuning, issued Mar. 30, 1999, discloses "a walking carriage or ambulatory aid having a frame that supports front wheels and a collapsing rear support for rear wheels. A seat supported to the push rods of the frame has a grip at its rear. The seat is connected with the support for the rear wheels so that when the rear of the seat is lifted, the rear wheels are pivoted toward the front wheels to collapse the carriage. A tray is pivoted to the frame between a first pivot position above the seat and a second position below the seat and over an article carrier supported on the frame." The disclosure of this United States patent is incorporated herein by reference.

U.S. Pat. No. 5,887,887 to van't Schip, issued Feb. 10, 2004, discloses "an aid for use when transporting elderly people and disabled people, comprising a frame provided with handle bars, the frame comprising a front and a rear frame section, each essentially consisting of a pair of frame bars or frame tubes with transverse connections, the frame bars or frame tubes having their lower ends designed for movement across the ground and the frame sections being foldably connected about a transverse axis that is located under handle bar level. The frame sections are also foldable in the transverse direction, due to the transverse connections between the frame tubes of the frame sections being formed by connecting bars which are adapted to be folded in or substantially in the plane of the respective frame section. The aid is adapted to be used both as a walking aid (rollator) and as a passive wheel chair."

To the best of the applicant's knowledge, there is no walker apparatus that can be maneuvered from an open position to a collapsed position in a smooth, dual action continuous motion wherein all four leg assemblies move inward, by operation or gripping of as little as one subcomponent, without the need to collapse various subassemblies in multiple steps.

Accordingly, embodiments of the present invention are provided that meet at least one or more of the following objects of the present invention.

It is an object of this invention to provide a walker apparatus that collapses into a highly compact configuration.

It is a further object of this invention to provide a walker apparatus that collapses in a continuous motion.

It is a further object of this invention to provide a walker apparatus that collapses in a single step.

It is a further object of this invention to provide a walker apparatus that collapses by causing all of the leg elements to move towards each other in a simultaneous motion.

SUMMARY OF THE INVENTION

In accordance with the present invention, there is provided a walker apparatus comprising a first front support leg assembly and a second front support leg assembly, each of the first front support leg assembly and the second front support leg assembly including an elongated member including a lower end, a central region, and an upper end; a lower front cross brace link; and a triangulation link.

The walker apparatus further comprises a first sliding joint comprising a body including a bore, a leg pivot link, an upper front cross brace link, and a central joint pivot link, wherein the central region of the elongated member of the first front support leg assembly is disposed within the bore of the first sliding joint, such that the first sliding joint is slidable along the central region of the elongated member of the first front support leg assembly; and a second sliding joint comprising a body including a bore, a leg pivot link, an upper front cross brace link, and a central joint pivot link, wherein the central region of the elongated member of the second front support leg assembly is disposed within the bore of the second sliding joint, such that the second sliding joint is slidable along the central region of the elongated member of the second front support leg assembly.

The walker apparatus further comprises a central hinge joint comprising a first arm and a second arm, each of the first and second arms comprising an inner end, wherein the inner end of the first arm is hingably connected to the inner end of the second arm; and each of the first and second arms comprising an outer end including a pivot link, the pivot link of the first arm being pivotably connected to the central joint pivot link of the first sliding joint, and the pivot link of the second arm being pivotably connected to the central joint pivot link of the second sliding joint.

The walker apparatus further comprises a first rear support leg assembly and a second rear support leg assembly, each of the first rear support leg assembly and the second rear support leg assembly comprising an elongated member including a lower end, a central region, and an upper end, wherein each of the upper ends of the first rear support leg assembly and the second rear support leg assembly further comprises a pivot link, the pivot link of the first rear support leg assembly being pivotably connected to the leg pivot link of the first sliding joint, and the pivot link of the second rear support leg assembly being pivotably connected to the leg pivot link of the second sliding joint; and each central region of the first rear support leg assembly and the second rear support leg assembly further comprises a triangulation link and a lower rear cross brace link.

The walker apparatus further comprises a first support member comprising a front end including a front link connected to the triangulation link of the first front support leg assembly, and a rear end including a rear link connected to the triangulation link of the first rear support leg assembly; and a second support member comprising a front end including a front link connected to the triangulation link of the second front support leg assembly, and a rear end including a rear link connected to the triangulation link of the second rear support leg assembly.

The walker apparatus further comprises a front leg collapsing assembly comprising a first front cross brace and a second front cross brace, each of the first front cross brace and the second front cross brace comprising a lower end, a central pivot connection region, and an upper end, wherein each of the upper ends of the first front cross brace and the second front cross brace further comprises an upper pivot link, the upper pivot link of the first front cross brace being pivotably connected to the upper front cross brace link of the first sliding joint, and the upper pivot link of the second front cross brace being pivotably connected to the upper front cross brace link of the second sliding joint; each of the lower ends of the first front cross brace and the second front cross brace further comprises a lower pivot link, the lower pivot link of the first front cross brace being pivotably connected to the lower front cross brace link of the second front support leg assembly, and the lower pivot link of the second front cross brace being pivotably connected to the lower front cross brace link of the first front support leg assembly; and the central pivot connection region of the first front cross brace is pivotably connected to the central pivot connection region of the second front cross brace.

The walker apparatus further comprises a rear leg collapsing assembly comprising a first rear cross brace and a second rear cross brace, each of the first rear cross brace and the second rear cross brace comprising a lower end, a central pivot connection region, and an upper end, wherein each of the upper ends of the first rear cross brace and the second rear cross brace comprises an upper universal joint, the upper universal joint of the first rear cross brace being connected to the first arm of the central hinge joint, and the upper universal joint of the second rear cross brace being connected to the second arm of the central hinge joint; each of the lower ends of the first rear cross brace and the second rear cross brace further comprises a lower pivot link, the lower pivot link of the first rear cross brace being pivotably connected to the lower rear cross brace link of the second rear support leg assembly, and the lower pivot link of the second rear cross brace being pivotably connected to the lower rear cross brace link of the first rear support leg assembly; and the central pivot connection region of the first rear cross brace is pivotably connected to the central pivot connection region of the second rear cross brace.

The elongated members of the front and rear support legs are rigid, and may be tubular members, fabricated from a metal such as steel or aluminum. The lower ends of the front support legs may have either soft tips, or castors joined thereto, depending upon the needs of the user of the walker. In like manner, the lower ends of the rear support legs may have glides that are slidable along the ground, soft tips, or wheels. If the rear legs are fitted with wheels, the walker may include brakes for applying a stopping force to the wheels. The brakes may be applied by the action of hand actuators that are connected to the brakes by actuating cables. The hand actuators may be included with hand grips that are joined to the upper ends of the front support legs. The upper ends of the front support legs may further include means for adjusting the height of the handgrips to ergonomically match the height of the user of the walker.

The central hinge joint may be provided as a locking hinge joint, wherein the central hinge joint locks in the open position, thereby rendering the walker apparatus more rigid and secure when in the open position. The central hinge joint may be made lockable by the use of a twist lock mechanism, or a spring loaded actuating button. In one embodiment of the locking hinge joint, the first arm of the locking hinge joint comprises a first housing half, and the second arm of the joint comprises a second housing half, wherein the first and second housing halves are pivotably joined to each other. The first and second housing halves include gear sockets that form a cavity therebetween for housing a toothed gear. The cavity further includes stops which limit the rotation of the first and second housing halves relative to each other, such limits being the maximum open and closed positions of the locking hinge joint. The second housing half further includes a button socket, for housing the spring and actuating button. The first and second housing halves may further include sockets formed therein, within which are disposed short lengths of tubing that form the outer ends of the first and second arms, each of which is provided with a pivot link for connection to the first and second sliding joints, respectively. On the side of the locking hinge joint that is opposite the side including the actuating button, the locking hinge joint may include a plate joined to each of the first and second housing halves, the plates being pivotably engaged with each other.

Each of the first and second sliding joints may include a seat post pivot link and a seat post support hook. The walker apparatus may be provided with a raisable and lowerable seat comprised of a first seat post pivotably joined to the seat post pivot link of the first sliding joint, a second seat post pivotably joined to the seat post pivot link of the second sliding joint, and a seat member engaged with and supported by the first and second seat posts. The seat member may be a fabric web. When the seat is lowered to a position wherein a user of the walker could sit upon the seat, the seat arm support hooks of the first and second sliding joints provide support to the first and second seat posts, thereby providing support to the seat member as the user is seated upon the seat member.

The first and second front cross braces of the front leg collapsing assembly are rigid, and define a front leg collapsing plane, which includes the first and second front support legs, and the first and second cross braces. The first and second front cross braces may be formed from tubular members, wherein at the central pivot connection regions thereof, the tubular members are flattened, thereby facilitating the pivot connection and operation between them. The first and second cross braces may also be formed into slight S-shapes, so as to provide a greater angle of rotation between them, thereby providing a greater degree of collapsibility of the walker apparatus. The central pivot connection between the first and second front cross brace members may be made by use of a suitable fastener, such as a rivet or a screw and nut assembly. The pivot connection between the first and second cross braces may be provided with protective and/or ornamental covers. The central pivot connection between the first and second cross braces is made at substantially the midpoints of the first and second cross braces, i.e. the lengths of the cross braces from the central pivot connection to the respective ends of each brace may be substantially equal.

The first and second front cross braces of the rear leg collapsing assembly are also rigid, and define a rear cross brace plane, which includes and the first and second cross braces. The first and second front cross braces may also be formed from tubular members, wherein at the central pivot connection regions thereof, the tubular members are flattened, thereby facilitating the pivot connection and operation between them. The upper ends of the first and second cross braces may also be formed into a flat shape to facilitate connection to their respective universal joints. The first and second cross braces may also be formed into slight S-shapes, so as to provide a greater angle of rotation between them, thereby providing a greater degree of collapsibility of the walker apparatus. The central pivot connection between the first and second front cross brace members may be made by use of a suitable fastener, such as a rivet or a screw and nut assembly. The pivot connection between the first and second cross braces may be provided with protective and/or ornamental covers. The central pivot connection between the first and second cross braces may be constructed so that the upper ends of the first and second cross braces, i.e. the lengths of the cross braces from the central pivot connection to the respective upper ends of each brace are shorter than the lengths of the cross braces from the central pivot connection to the respective lower ends of each brace.

One aspect of the invention is based on the discovery of techniques and combinations of structural elements that provide a dual fold mechanism in a collapsible walker. The dual fold mechanism enables collapsing of the walker into its fully collapsed shape in a continuous motion. The dual fold mechanism may be implemented by a combination of collapsing cross brace assemblies, parallelogram-forming linkages, or four-bar linkages.

The technique and apparatus is advantageous because it enables the provision of a highly featured, structurally strong walker apparatus that can be collapsed into a compact shape with a simple continuous motion and operation of one of the subassemblies. As a result of the invention, disabled and/or elderly persons may have improved ambulatory capabilities in a variety of locations.

BRIEF DESCRIPTION OF THE DRAWINGS

The invention will be described by reference to the following drawings, in which like numerals refer to like elements, and in which.

Figure 1:
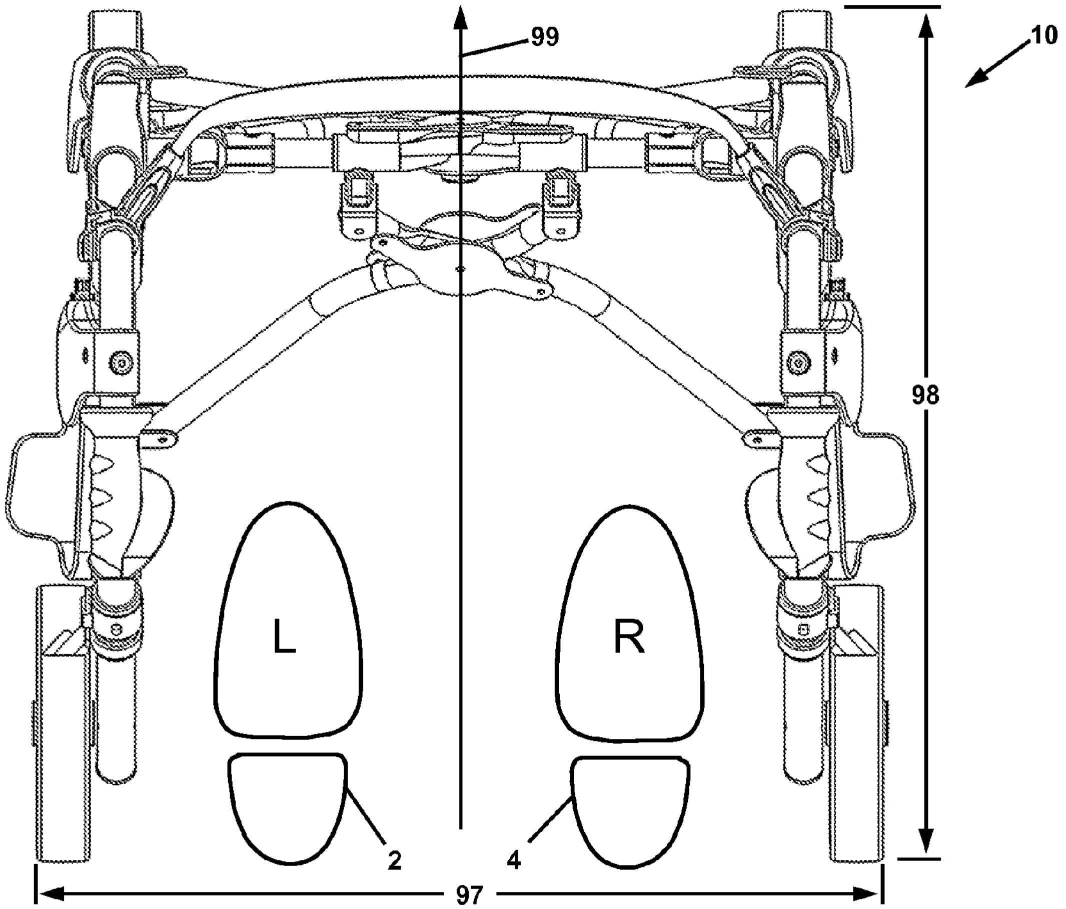
FIG. 1 is a top view of one embodiment of the applicant's walker apparatus.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

As used herein, the term “open” with respect to a walker apparatus is meant to indicate that the walker is deployed on a horizontal surface and ready for use with all four leg assemblies rigidly engaged with each other.

As used herein, the term “collapsed” with respect to a walker apparatus is meant to indicate the opposite of “open”, i.e. the device is retracted to its most compact configuration for the purpose of storage or transportation in a confined space.

As used herein, the terms “hingably” and “pivotably,” and hingeable” and pivotable” are used interchangeably, and, with respect to a pair of operatively connected parts are meant to indicate that the first part of the pair rotates with respect to the second part at their common attachment point, as occurs with a hinge mechanism.

As used herein, the term “slideable” is meant to indicate, with respect to a component, the ability of the component to be moved in a sliding manner along an axis or direction defined by one or more leg members.

In the following description, the point of reference used is that of the user of the walker. This point of reference is best understood with reference to FIG. 1, which is a top view of one embodiment of the applicant’s walker invention. Referring to FIG. 1, walker 10 is useable by an individual for ambulatory assistance. The approximate position of the user’s feet when using the walker 10 for assistance in walking are shown by foot prints 2 and 4. The forward direction with respect to the walker is indicated by arrow 99.

Hence in the following description, the general front portion of the walker is that portion towards the arrowhead of arrow 99, and the rear portion is that portion towards the tail of arrow 99. The left portion of the walker is the portion to the left of arrow 99 and more proximate to the left foot 2 of the user, and the right portion of the walker 10 is the portion to the right of arrow 99 and more proximate to the right foot 4 of the user.

Figure 2:
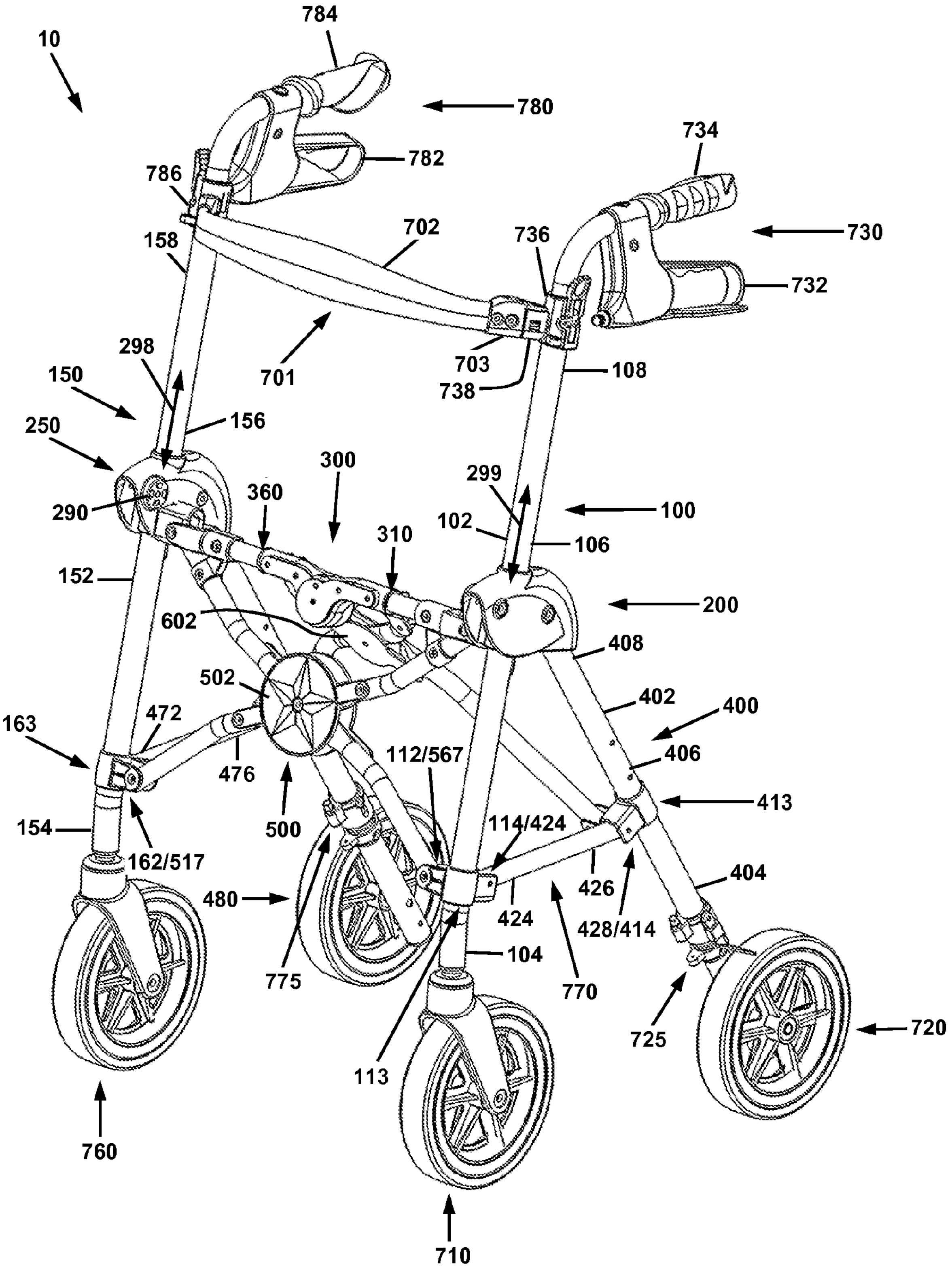
FIG. 2 is a front left perspective view of one embodiment of the applicant's walker apparatus.
Figure 3:
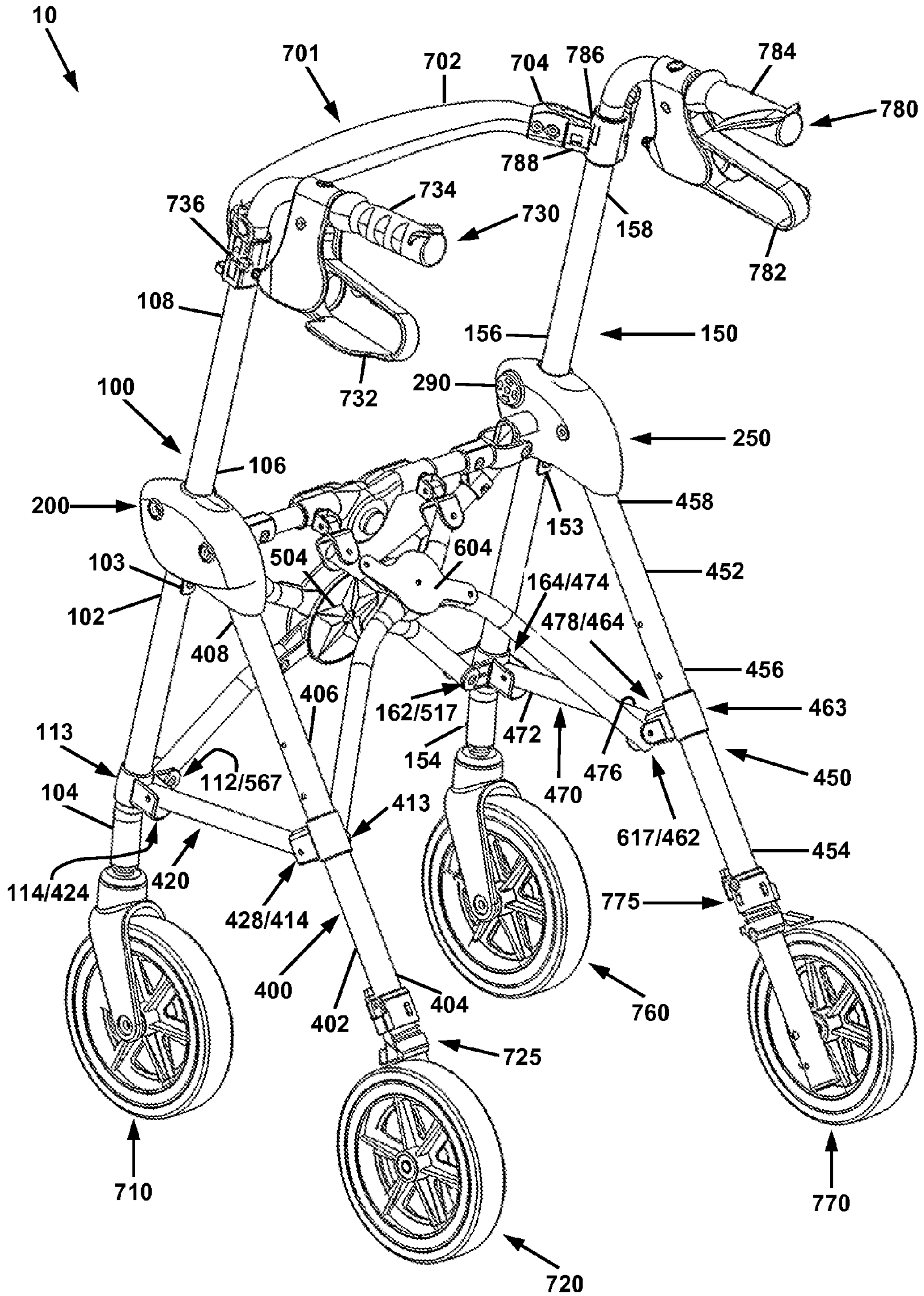
FIG. 3 is a rear left perspective view of the walker apparatus of FIG. 2.
Figure 4:
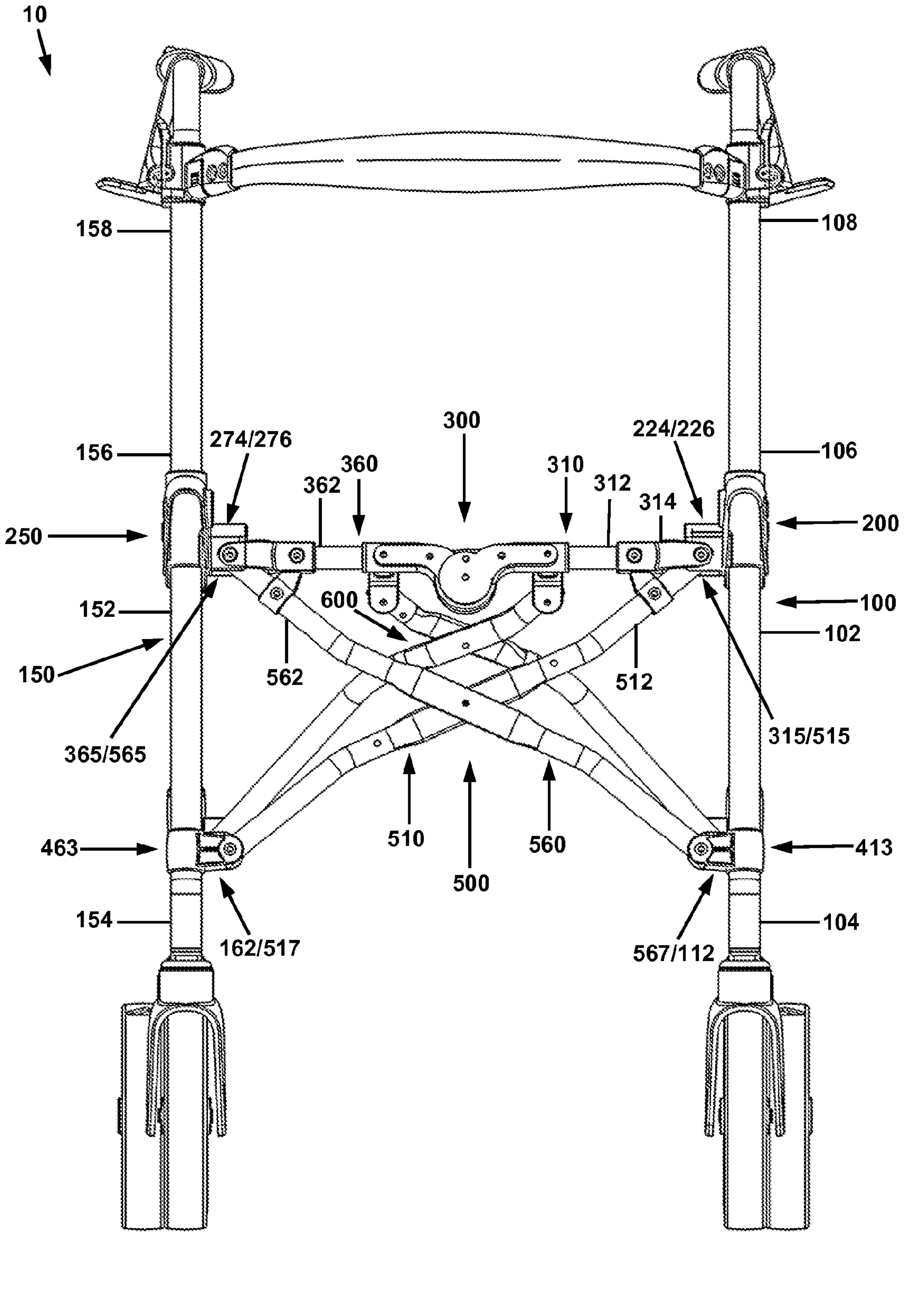
FIG. 4 is a front elevation view of the walker apparatus of FIG. 2.
Figure 5:
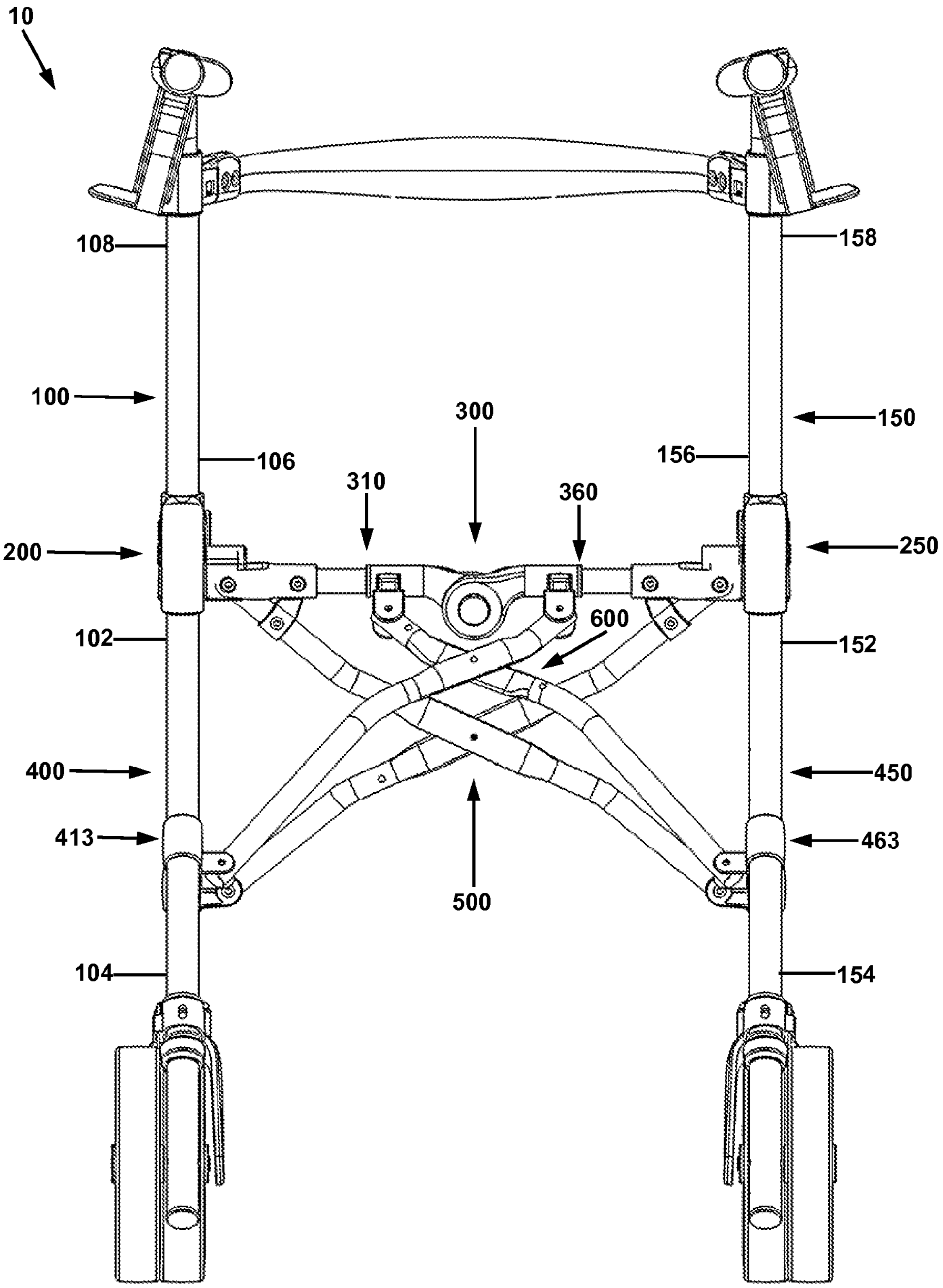
FIG. 5 is a rear elevation view of the walker apparatus of FIG. 2.
Figure 6:
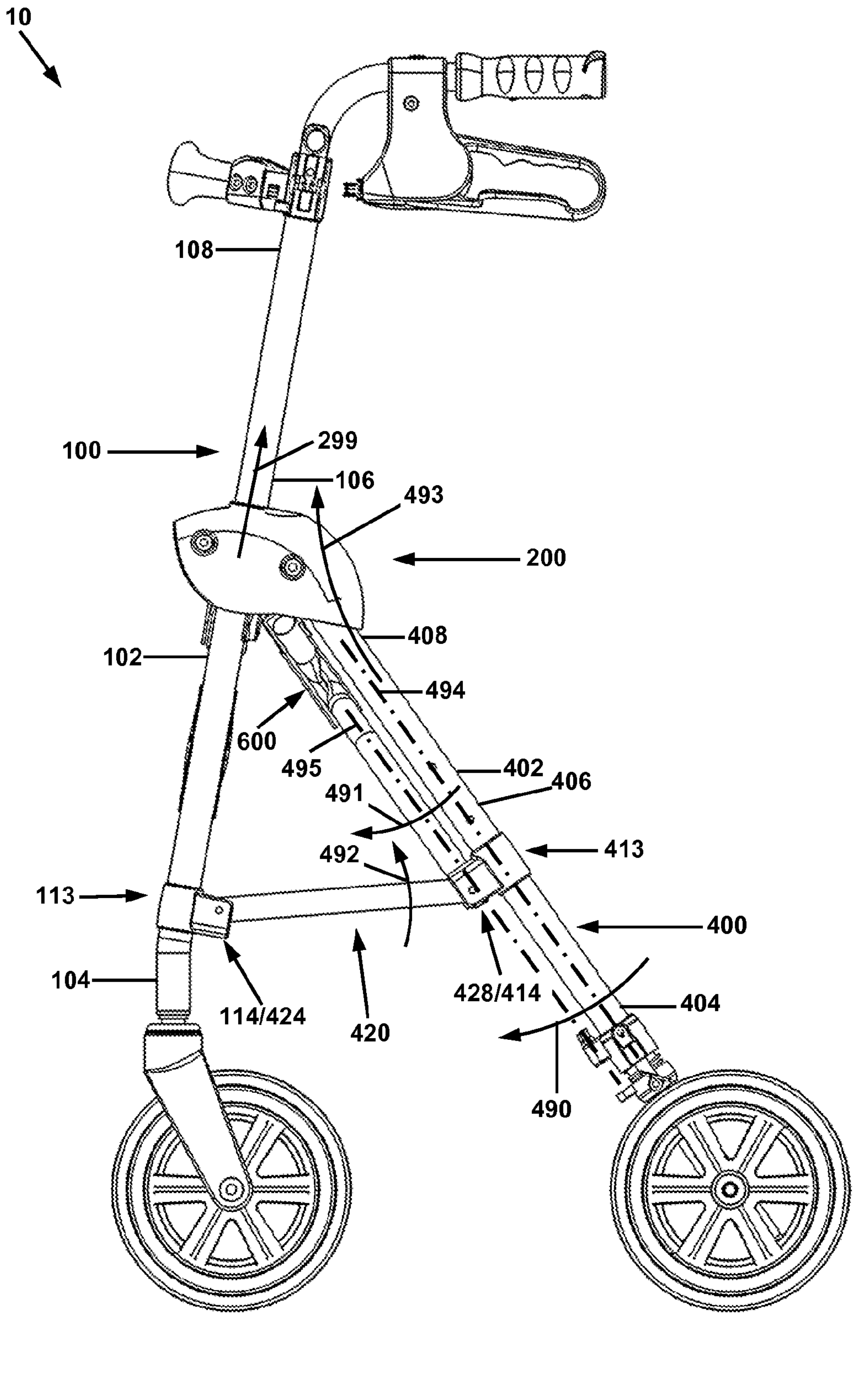
FIG. 6 is a left side elevation view of the walker apparatus of FIG. 2.

The general arrangement of the various subassemblies and components of one embodiment of the applicant’s walker apparatus are best understood with reference to FIGS. 2-6, wherein FIG. 2 is a front left perspective view of one embodiment of the applicant’s walker apparatus; FIG. 3 is a rear left perspective view of the walker apparatus of FIG. 2; FIG. 4 is a front elevation view of the walker apparatus of FIG. 2; FIG. 5 is a rear elevation view of the walker apparatus of FIG. 2; and FIG. 6 is a left side elevation view of the walker apparatus of FIG. 2.

Referring to FIGS. 2-6, walker apparatus 10 is comprised of a first front support leg assembly 100, a second front support leg assembly 150, a first sliding joint 200, a second sliding joint 250, a central hinge joint 300, a first rear support leg assembly 400, a second rear support leg assembly 450, a first support member 420, a second support member 470, a front leg collapsing assembly 500, and a rear leg collapsing assembly 600.

The first front support leg assembly 100 includes an elongated member 102 including a lower end 104, a central region 106, and an upper end 108, a lower front cross brace link 112, and a triangulation link 114. In like manner, the second front support leg assembly 150 includes an elongated member 152 including a lower end 154, a central region 156, and an upper end 158, a lower front cross brace link 162, and a triangulation link 164.

Figure 7A:
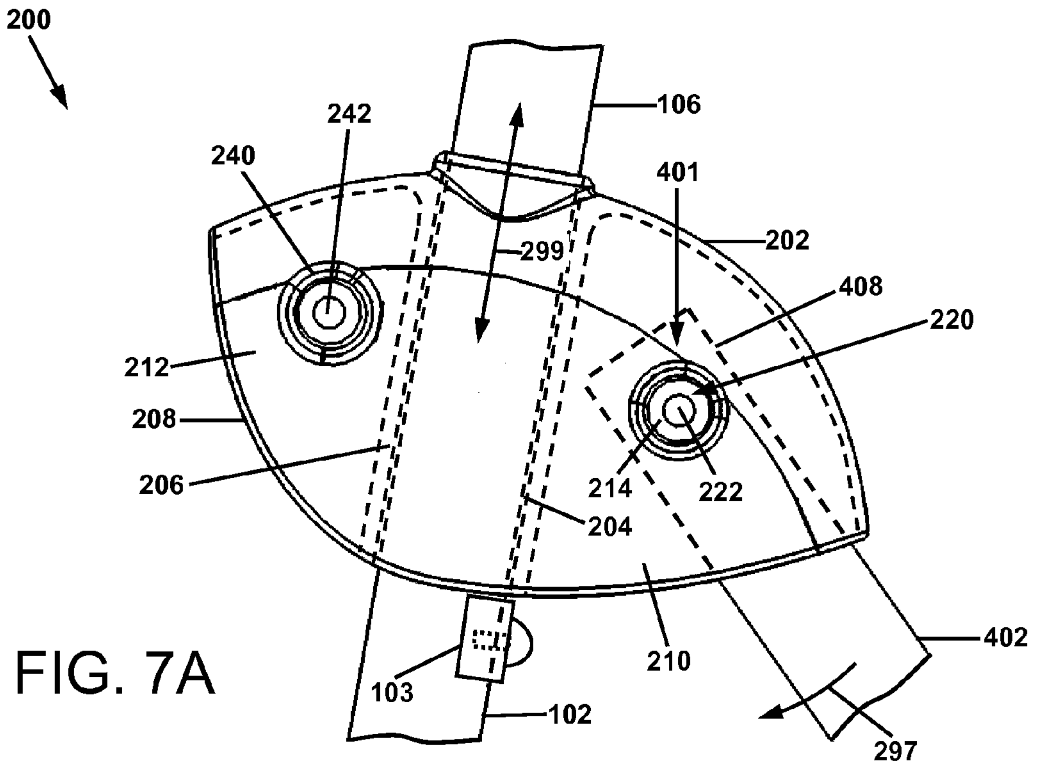
FIG. 7A is a detailed outer side elevation view of one sliding joint of the walker apparatus.
Figure 7B:
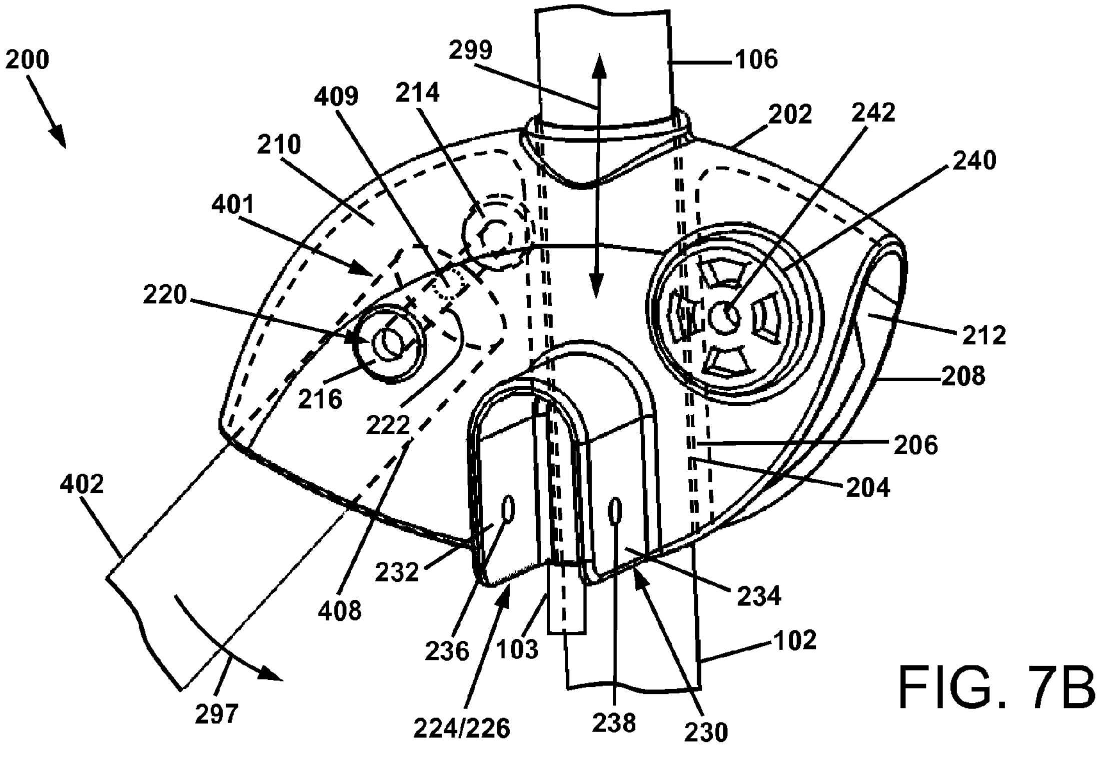
FIG. 7B is a first detailed inner side perspective view of one sliding joint of the walker apparatus.
Figure 7C:
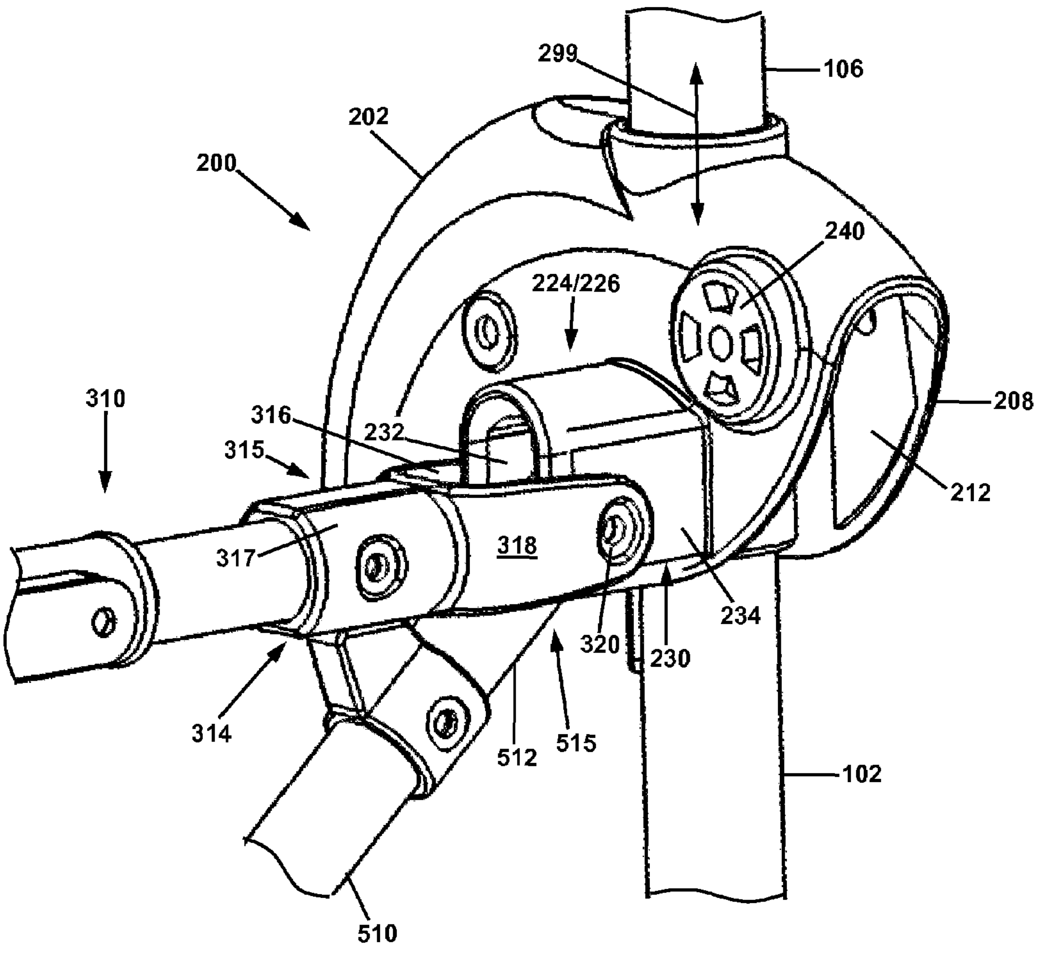
FIG. 7C is a second detailed inner side perspective view of one sliding joint of the walker apparatus depicting the central joint pivot link and the upper front cross brace link of such sliding joint.

The walker apparatus further comprises a first sliding joint and a second sliding joint, which enable the walker to be collapsed into a compact shape. The structure and function of the first and second sliding joints are best understood with reference additionally in particular to FIGS. 7A-7C. FIG. 7A is a detailed outer side elevation view of one sliding joint of the walker apparatus. FIG. 7B is a detailed inner side perspective view of one sliding joint of the walker apparatus. FIG. 7C is a second detailed inner side perspective view of one sliding joint of the walker apparatus depicting the central joint pivot link and the upper front cross brace link of such sliding joint. Sliding joint 200 is depicted in FIGS. 7A-7C, with it being understood that sliding joint 250 of apparatus 10 is formed as a mirror image of sliding joint 200, and has essentially the same structure and function on the opposite side of apparatus 10.

Sliding joint 200 comprises a body 202 including a bore 204 through the central region of body 202. Elongated member 102 of first front support leg assembly 100 is disposed within bore 204 of body 202. Bore 204 is provided with a slightly greater diameter than the diameter of elongated member 102, such that sliding joint 200 is slidable upwardly and downwardly along the central region 106 of the elongated member 102, as indicated by bidirectional arrow 299. In like manner, sliding joint 250 is made slidable upwardly and downwardly along the central region 156 of the elongated member 152 of second support leg assembly 150, as indicated by bidirectional arrow 298.

In one preferred embodiment, body 202 is formed with a central core 206 within which is formed bore 204, and a shell wall 208. Within shell wall 208 there is provided a first cavity 210 and a second cavity 212. A leg pivot link 220 is provided in sliding joint 200 for the purpose of pivotably joining sliding joint 200 to the pivot link 401 at the upper end 408 of elongated member 402 of rear support leg assembly 400 to such that elongated member 402 is pivotable with respect to sliding joint 200 as indicated by arcuate arrow 297.

In the embodiment of the sliding joint 200 depicted in FIGS. 7A and 7B, leg pivot link 220 is comprised of pin 222; and pivot link 401 of rear support leg assembly 400 is comprised of a through hole 409 that passes through the upper end 408 of elongated member 402. Pin 222 is joined to shell wall 208 of sliding joint 200 by adhesive, a press fit, or other suitable means, and pin 222 passes through the through hole 409 of member 402. Reinforcing bosses 214 and 216 may also be provided in shell wall 208 to provide additional structural strength at pin 222. In an alternate embodiment (not shown), pivot link 220 may be comprised of a rivet, or a bolt or a screw that passes through the through hole 409 of member 402, with a nut threadedly engaged with the bolt or screw.

It will be apparent that pivot link 220 of sliding joint 200 and pivot link 401 of first rear support leg assembly 400 are considered to be means for pivotably joining rear leg support assembly 400 to sliding joint 200, and thus may be provided in many equivalent forms. For example in an alternate embodiment (not shown), elongated member 402 could be provided with a U-shaped yoke with a through hole passing through each leg of the yoke, and sliding joint 200 could be provided with an ear with a corresponding through hole, with a pin passing through both the yoke of elongated member 402 and the ear of sliding joint 200, thus rendering leg assembly 400 pivotably joined to sliding joint 200. There are many additional structures known for pivotably joining a first member to a second member, and that such structures are considered to be pivot links as described herein for pivotably joining elongated member 402 to sliding joint 200, and for numerous other similar pivoting links that are described herein as part of the applicant's walker apparatus.

Referring again in particular to FIGS. 4, 7B, and 7C, sliding joint 200 is further provided with a central joint pivot link 224 for pivotably joining sliding joint 200 to a pivot link 315 at the outer end 312 of the first arm 310 of central joint 300, and an upper front cross brace link 226 for pivotably joining sliding joint 200 to an upper pivot link 515 at the upper end 512 of a first front cross brace 510 of front leg collapsing assembly 500.

In one embodiment (not shown), central joint pivot link 224 and upper front cross brace link 226 are provided as separate structures on sliding joint 200. In the embodiment of the walker apparatus 10 depicted in FIGS. 4, 7B, and 7C, central joint pivot link and upper front cross brace link 226 are provided as a single unitary structure formed as part of sliding joint 200. Links 224/226 are provided by an arched open-bottom box 230 formed on the side of body 202 of pivot link 200. The vertical walls 232 and 234 of box 230 are provided with through holes 236 and 238.

In this manner, the links of other components may be joined to box 230 between walls 232 and 234, or on the outside surfaces of walls 232 and 234. Upper pivot link 515 at the upper end 512 of a first front cross brace 510 of front leg collapsing assembly 500 is comprised of a through hole (not shown) through the upper end 512 of first front cross brace 510, in substantially the same manner as was previously described herein and shown in FIGS. 7A and 7B with respect to pivot link 401 of rear support leg assembly 400. Upper end 512 of first front cross brace 510 is disposed between the walls 232 and 234 of box 230.

Pivot link 315 at the outer end 312 of the first arm 310 of central hinge joint 300 is comprised of a yoke 314 joined at the center branch 317 thereof to outer end 312 of first arm 310. Arms 316 and 318 of yoke 314 straddle the outside of walls 232 and 234 of box 230, and are provided with through holes for engagement with a fastener. A rivet 320, or alternatively, a press fit pin, or nut and bolt fastener, which passes through holes 236 and 238 is used to pivotably join yoke 314 to box 230. Rivet 320 also passes through the upper end 512 of first front cross brace 510, such that first front cross brace 510 is pivotably joined to box 230.

Thus upper pivot link 515 of first front cross brace 510 and pivot link 315 of central hinge joint 300 are pivotably joined to central joint pivot link 224 and upper front cross brace link 226 of sliding joint 200. It will be apparent that many other configurations of such pivot links may be used to achieve the same results, as previously described herein.

In substantially the same manner, but with the respective components being mirror images of those depicted in FIGS. 7A-7C, second sliding joint 250 is provided with a central joint pivot link 274 for pivotably joining sliding joint 250 to a pivot link 365 at the outer end 362 of the second arm 360 of central hinge joint 300, and an upper front cross brace link 276 for pivotably joining sliding joint 250 to an upper pivot link 565 at the upper end 562 of a second front cross brace 560 of front leg collapsing assembly 500.

Figure 8A:
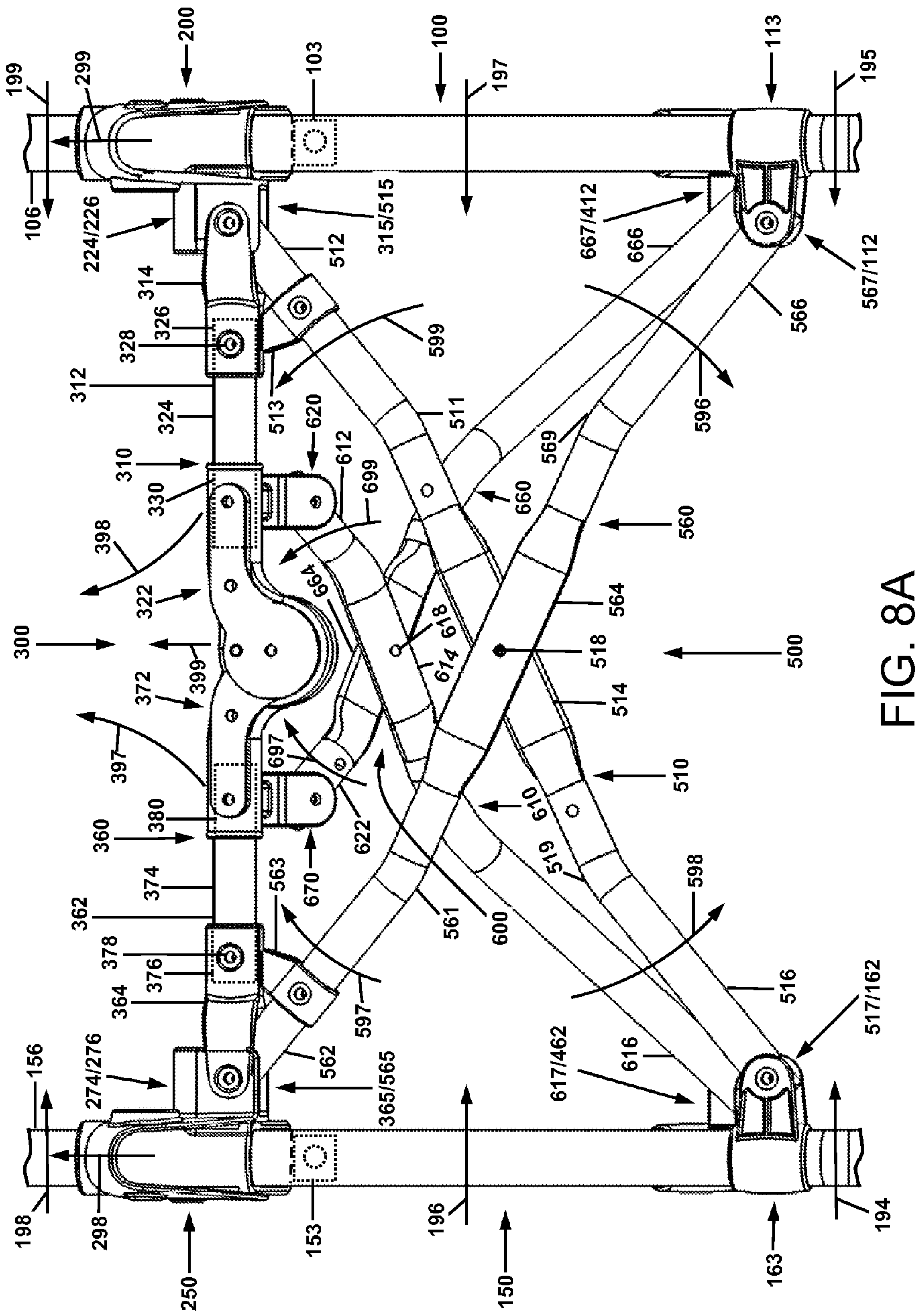
FIG. 8A is a detailed front elevation view of the central hinge joint, front leg collapsing assembly, and rear leg collapsing assembly of the walker apparatus.
Figure 8B:
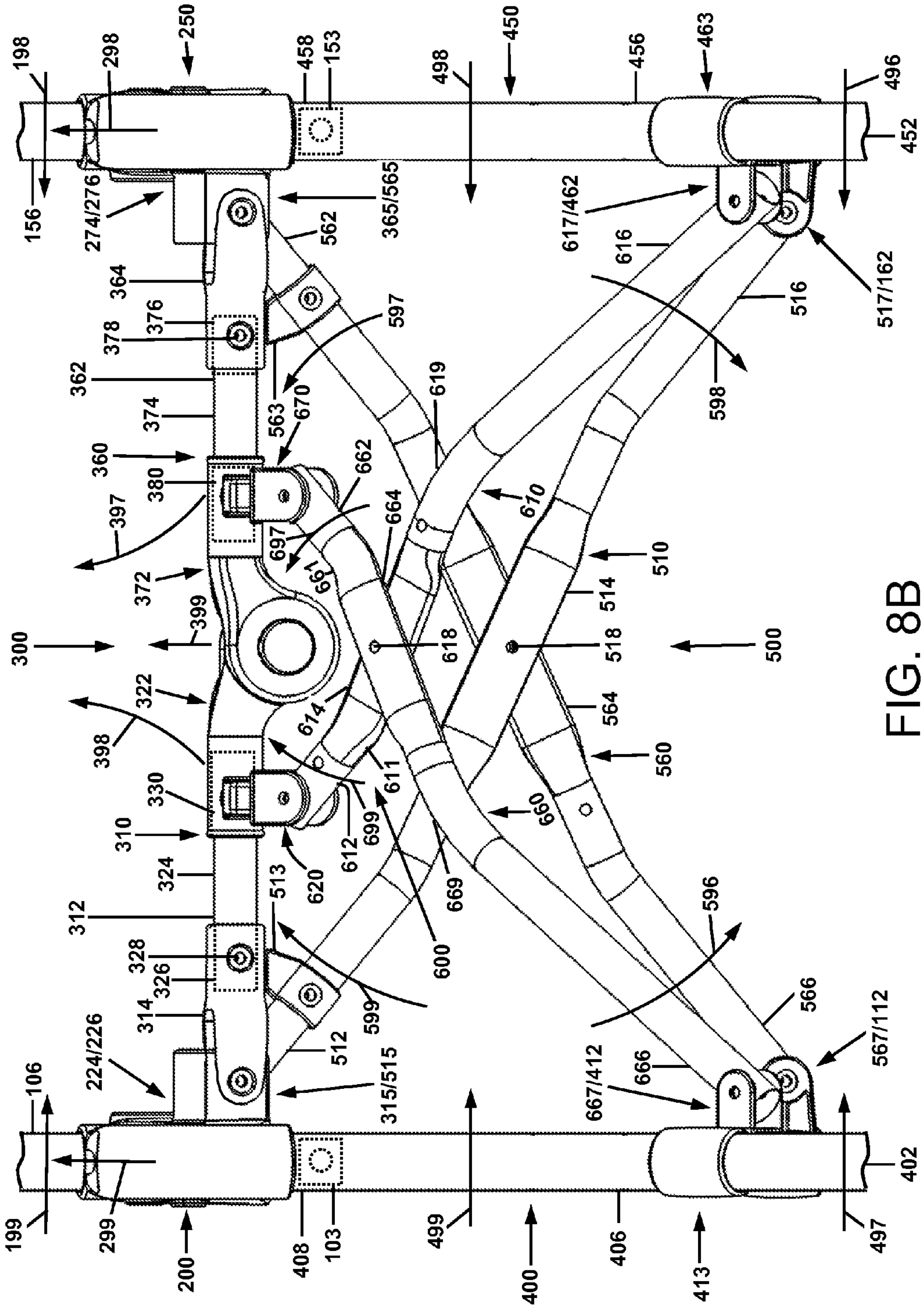
FIG. 8B is a detailed rear elevation view of the central hinge joint, front leg collapsing assembly, and rear leg collapsing assembly of the walker apparatus.

The central hinge joint 300, front leg collapsing assembly 500, and rear leg collapsing assembly 600 of the applicant's walker apparatus 10 will now be described in further detail. Central hinge joint 300, front leg collapsing assembly 500, and rear leg collapsing assembly 600 are best understood with reference in particular to FIGS. 8A and 8B. FIG. 8A is a detailed front elevation view of the central hinge joint 300, front leg collapsing assembly 500, and rear leg collapsing assembly 600 of the walker apparatus 10; and FIG. 8B is a detailed rear elevation view of the central hinge joint 300, front leg collapsing assembly 500, and rear leg collapsing assembly 600 of the walker apparatus 10.

As was described previously, central hinge joint 300 is comprised of a first arm 310 and a second arm 360. First arm 310 is comprised of an inner end 322, and second arm 360 is comprised of an inner end 372 , wherein the inner end 322 of the first arm 310 is hingably connected to the inner end 372 of the second arm 360. First arm 310 comprises an outer end 312 including a pivot link 315 that is pivotably connected to the central joint pivot link 224 of the first sliding joint 200. Second arm 360 comprises an outer end 362 including a pivot link 365 that is pivotably connected to the central joint pivot link 274 of the second sliding joint 250. In the embodiment depicted in FIGS. 8A and 8B, the first arm 310 of central hinge joint 300 is comprised of a tubular section 324 that connects the inner end 322 of first arm 310 to the yoke 314 of first arm 310. Tubular section 324 may be disposed within a socket 326 formed in yoke 314 and joined thereto by adhesive, or a fastener such as rivet 328. In like manner, tubular section 324 may be disposed within a socket 330 formed in inner end 322 of first arm 310 and joined thereto by adhesive, or a fastener (not shown). In like manner with respect to second arm 360, of central hinge joint 300, tubular section 374 may be disposed within a socket 376 formed in yoke 364 and joined thereto by adhesive, or a fastener such as rivet 378; and tubular section 374 may be disposed within a socket 380 formed in inner end 372 of first arm 360 and joined thereto by adhesive, or a fastener (not shown).

Front leg collapsing assembly 500 comprises a first front cross brace 510 and a second front cross brace 560. First front cross brace 510 includes a lower end 516, a central pivot connection region 514, and an upper end 512. The upper end 512 of first front cross brace 510 further comprises an upper pivot link 515 that is pivotably connected to the upper front cross brace link 226 of first sliding joint 200 as described previously. The lower end 516 of first front cross brace 510 comprises a lower pivot link 517 that is pivotably connected to a lower front cross brace link 162 of the second front support leg assembly 150. The central pivot connection region 514 of the first front cross brace 510 is pivotably connected to the central pivot connection region 564 of the second front cross brace 560 by use of a suitable fastener such as rivet 518, or equivalently, a loosely fitted locking nut and bolt, or locking nut and screw, or other suitable fastener. In like manner, second front cross brace 560 includes a lower end 566, a central pivot connection region 564, and an upper end 562. The upper end 562 of second front cross brace 560 further comprises an upper pivot link 565 that is pivotably connected to the upper front cross brace link 276 of second sliding joint 250 as described previously. The lower end 566 of second front cross brace 560 comprises a lower pivot link 567 that is pivotably connected to a lower front cross brace link 112 of the first front support leg assembly 100. The specific joining structures of lower pivot link 567 to lower front cross brace link 112, and of lower pivot link 517 to lower front cross brace link 162 may be made as shown in the Figures and described previously in this specification for the joining of other pivot links.

Rear leg collapsing assembly 600 comprises a first rear cross brace 610 and a second rear cross brace 660. First rear cross brace 610 includes a lower end 616, a central pivot connection region 614, and an upper end 612. The upper end 612 of first rear cross brace 610 further comprises an upper universal joint 620 connected to the first arm 310 of the central hinge joint 300. The lower end 616 of first rear cross brace 610 comprises a lower pivot link 617 that is pivotably connected to a lower rear cross brace link 462 of the second rear support leg assembly 450. The central pivot connection region 614 of the first rear cross brace 610 is pivotably connected to the central pivot connection region 664 of the second rear cross brace 660 by use of a suitable fastener such as rivet 618, or equivalently, a loosely fitted locking nut and bolt, or locking nut and screw, or other suitable fastener. In like manner, second rear cross brace 660 includes a lower end 666, a central pivot connection region 664, and an upper end 662. The upper end 662 of second rear cross brace 660 further comprises an upper universal joint 670 connected to the second arm 360 of the central hinge joint 300. The lower end 666 of second rear cross brace 660 comprises a lower pivot link 667 that is pivotably connected to a lower rear cross brace link 412 of the first rear support leg assembly 400. The specific joining structures of lower pivot link 667 to lower front cross brace link 412, and of lower pivot link 617 to lower front cross brace link 462 may be made as shown in the Figures and described previously in this specification for the joining of other pivot links.

The first rear support leg assembly 400, the second rear support leg assembly 450, the first support member 420, and the second rear support member 470 of the applicant's walker apparatus 10 will now be described in further detail. First rear support leg assembly 400, second rear support leg assembly 450, first support member 420, and the second rear support member 470 are best understood with reference in particular to FIGS. 2, 3, 6, and 8B.

First rear support leg assembly 400 is comprised of an elongated member 402 including a lower end 404, a central region 406, and an upper end 408 comprising a pivot link 401 that is pivotably joined to leg pivot link 220 of sliding joint 200 as previously described. Central region 406 of first rear support leg assembly includes a triangulation link 414 and a lower rear cross brace link 412. Triangulation link 414 and a lower rear cross brace link 412 may be separate structures joined to elongated member 402 of first leg support assembly 400. In the embodiment of the apparatus 10 depicted in FIGS. 2, 3, 6, and 8B in particular, triangulation link 414 and lower rear cross brace link 412 are provided in a single piece rear coupling 413.

Figure 9:
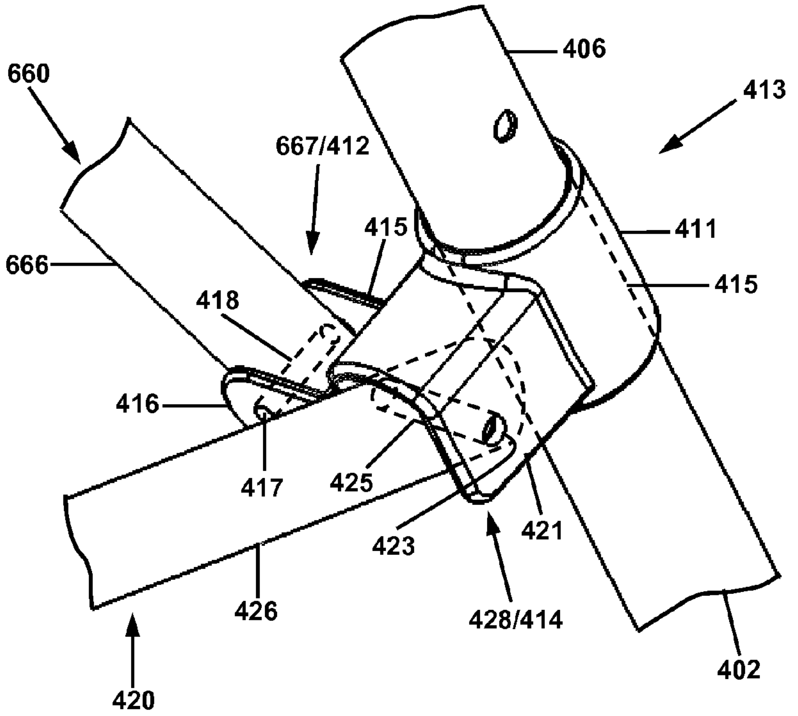
FIG. 9 is a detailed perspective view of a single piece rear coupling of a rear leg assembly including a triangulation link and a lower rear cross brace link.

FIG. 9 is a detailed perspective view of such a single piece rear coupling 413 which includes triangulation link 414 and lower rear cross brace link 412. Rear coupling 413 is comprised of a body 411 through which is provided a bore 415. Elongated member 402 of rear support leg assembly 400 is disposed within bore 415, and elongated member 402 is joined to body 411 of rear coupling 413 by adhesive, a rivet (not shown) or other suitable fastening means. Lower rear cross brace link 412 of rear support leg assembly 400, which is pivotably joined to lower pivot link 667 of second rear cross brace 660 as previously described herein, is comprised of a first ear 415 with a through hole (not shown) and a second ear 416 with a through hole 417. Lower end 666 of second cross brace 660 is provided with a corresponding through hole, such that rivet 418 is fitted within the through holes through ears 415 and 416, and through lower end 666 of second cross brace 660, thereby pivotably joining second cross brace 660 to rear leg assembly 400. It will be apparent that other suitable fasteners such as a press fit pin, a rolled pin, a split pin, or a nut and bolt may be used instead of rivet 418. It will be further apparent that many other equivalent structures may be used to form the pivot link 667/lower cross brace link 412 connection as previously described herein.

In like manner, second rear support leg assembly 450 is comprised of an elongated member 452 including a lower end 454, a central region 456, and an upper end 458 comprising a pivot link that is pivotably joined to a leg pivot link of sliding joint 250 as previously described. Central region 406 of second rear support leg assembly 450 includes a triangulation link 464 and a lower rear cross brace link 462. Triangulation link 464 and lower rear cross brace link 462 may be separate structures joined to elongated member 452 of second rear support leg assembly 450. In the embodiment of the apparatus 10 depicted in FIGS. 2, 3, 6, and 8B in particular, triangulation link 464 and lower rear cross brace link 462 are provided in a single piece rear coupling 463. Single piece rear coupling 463 is joined to elongated member 452 of rear support leg assembly 450, and is substantially the same in structure and function as single piece rear coupling 413, except that single piece rear coupling 463 is a mirror image of single piece rear coupling 413. Lower rear cross brace link 462 of rear support leg assembly 450 is pivotably joined to lower pivot link 617 of second rear cross brace 610 as previously described herein.

Turning now to the support members of apparatus 10, first support member 420 is comprised of a front end 422 including a front link 424 connected to the triangulation link 114 of the first front support leg assembly 100, and a rear end 426 including a rear link 428 connected to the triangulation link 414 of the first rear support leg assembly 400. Referring again to FIG. 9, triangulation link 414 of single piece rear coupling 413 is comprised of a first ear 421 with a through hole 423 and a corresponding second ear with a through hole on the opposite side of support member 420. Rear end 426 of first support member 420 is provided with a corresponding through hole, such that rivet 425 is fitted within the through holes through ear 421 and the corresponding opposite ear, and through rear end 426 of first support member 420, thereby pivotably joining first support member 420 to rear leg assembly 400. It will be apparent that other suitable fasteners such as a press fit pin, a rolled pin, a split pin, or a nut and bolt may be used instead of rivet 425. It will be further apparent that many other equivalent structures may be used to form the rear link 428/triangulation link 414 connection as previously described herein.

Figure 10:
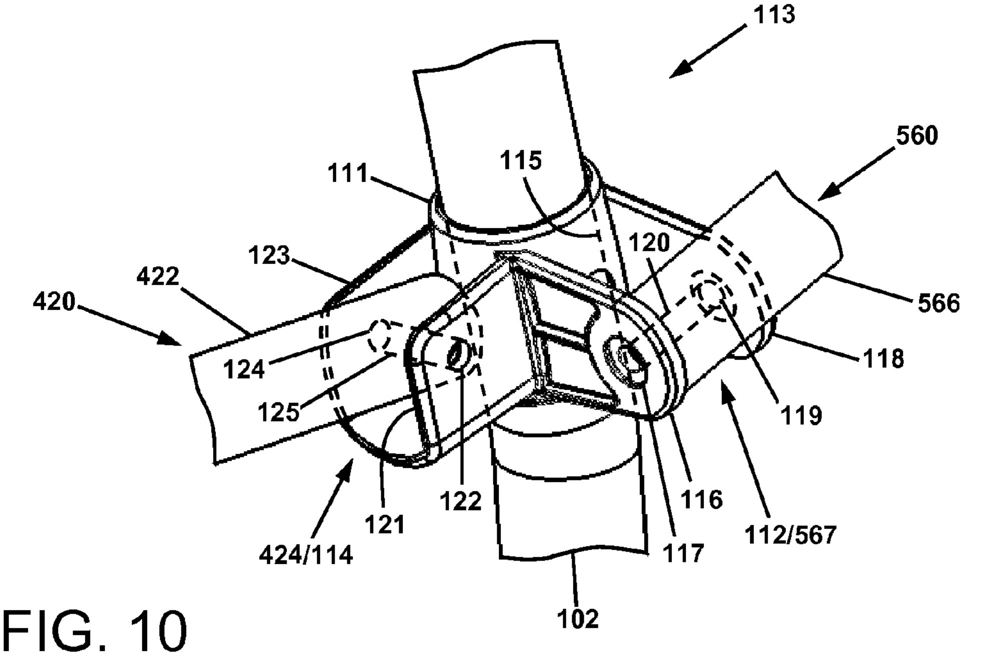
FIG. 10 is a detailed perspective view of a single piece front coupling of a front leg assembly including a triangulation link and a lower front cross brace link.

FIG. 10 is a detailed perspective view of a single piece front coupling 113 of front leg assembly 100, which includes triangulation link 114 and a lower front cross brace link 112. Front coupling 113 is comprised of a body 111 through which is provided a bore 115. Elongated member 102 of front support leg assembly 100 is disposed within bore 115, and elongated member 102 is joined to body 111 of front coupling 113 by adhesive, a rivet (not shown) or other suitable fastening means. Lower front cross brace link 112 of front support leg assembly 100, which is pivotably joined to lower pivot link 567 of second front cross brace 560 as previously described herein, is comprised of a first ear 116 with a through hole 117 and a second ear 118 with a through hole 119. Lower end 566 of second cross brace 560 is provided with a corresponding through hole, such that rivet 120 is fitted within the through holes through ears 116 and

118, and through lower end 566 of second cross brace 560, thereby pivotably joining second cross brace 560 to front leg assembly 100. It will be apparent that other suitable fasteners such as a press fit pin, a rolled pin, a split pin, or a nut and bolt may be used instead of rivet 120. It will be further apparent that many other equivalent structures may be used to form the pivot link 567/lower cross brace link 112 connection as previously described herein.

In like manner, second front support leg assembly 150 is comprised of an elongated member 152 including a lower end 154, a central region 156, and an upper end 158. Lower end 154 of second front support leg assembly 150 includes a triangulation link 164 and a lower front cross brace link 162. Triangulation link 164 and lower front cross brace link 162 may be separate structures joined to elongated member 152 of second front support leg assembly 150. In the embodiment of the apparatus 10 depicted in FIGS. 2, 3, 6, and 8B in particular, triangulation link 164 and lower front cross brace link 162 are provided in a single piece front coupling 163. Single piece front coupling 163 is joined to elongated member 152 of front support leg assembly 150, and is substantially the same in structure and function as single piece front coupling 113, except that single piece front coupling 163 is a mirror image of single piece front coupling 113. Lower front cross brace link 162 of front support leg assembly 150 is pivotably joined to lower pivot link 517 of second front cross brace 510 as previously described herein.

Referring again to FIG. 10, first support member 420 is comprised of a front end 422 including a front link 424 connected to the triangulation link 114 of the first front support leg assembly 100. Triangulation link 114 of single piece front coupling 113 is comprised of a first ear 121 with a through hole 122 and a corresponding second ear 123 with a through hole 124 on the opposite side of support member 420. Front end 422 of first support member 420 is provided with a corresponding through hole, such that rivet 125 is fitted within the through holes through ear 121 and the corresponding opposite ear 123, and through front end 422 of first support member 420, thereby pivotably joining first support member 420 to front leg assembly 100. It will be apparent that other suitable fasteners such as a press fit pin, a rolled pin, a split pin, or a nut and bolt may be used instead of rivet 125. It will be further apparent that many other equivalent structures may be used to form the front link 424/triangulation link 114 connection as previously described herein.

The structure of second support member 470 is substantially the same as that of first support member 420. Referring to FIG. 3, second support member 470 is comprised of a front end 472 including a front link 474 connected to the triangulation link 164 of the second front support leg assembly 150, and a rear end 476 including a rear link 478 connected to the triangulation link 464 of the second rear support leg assembly 450. Links 474 and 164, and links 478 and 464 are joined as was described for first support member 420.

In the embodiment of the apparatus 10 depicted in FIGS. 2, 3, 6, 9, and 10, first and second support members 420 and 470 are depicted as rigid tubular members. The main function of first and second support members is to provide a force which prevents the first front leg assembly and the first rear leg assembly, and the second front leg assembly and the second rear leg assembly from spreading away from each other when the walker is in use. In performing this function, the first and second support members are in tension. Thus first and second support members are not required to be tubular members, and could be flexible members, such as cables. Such cable members might flex when the apparatus is collapsed, but would limit the separation of the front and rear leg assemblies when the apparatus is in use and the front and rear support members are in tension. In general, any member which maintains a fixed length when subjected to tension by the front and rear leg assemblies would be suitable. However, rigidity in support members 420 and 470 is considered to be advantageous. The first and second support members 420 and 470, by virtue of being rigid members, perform in a secondary manner when the apparatus is in compression—as when the walker is lifted off of the walking surface, to maintain the apparatus in a rigid formation.

In general, it is preferable that the applicant's walker apparatus be made of lightweight and structurally strong materials. The elongated members 102, 152, 402, and 452 of the front support leg assemblies 100 and 150, and the rear support leg assemblies 400 and 450 are rigid members. These members may be tubular in construction, and made of thin wall aluminum tubing or steel tubing. Alternatively, the tubular members may be made of engineering grade plastic resins or composite materials, such as a glass or carbon fiber reinforced polymer.

Referring in particular to FIG. 8A, the first and second front cross braces 510 and 560 of the front leg collapsing assembly 500 are rigid, and define a front leg collapsing plane, which includes the first and second front support leg elongated members 102 and 152, and the first and second cross braces 510 and 560. The first and second front cross braces 510 and 560 may be formed from tubular members, wherein at the central pivot connection regions 514 and 564 thereof, the tubular members are flattened, thereby facilitating the pivot connection and operation between them. The first and second cross front braces may also be formed into slight S-shapes, so as to provide a greater angle of rotation between them, thereby providing a greater degree of collapsibility of the walker apparatus. First front cross brace 510 is formed comprising upper bend 511 and lower bend 519, and second front cross brace 560 is formed comprising upper bend 561 and lower bend 569.

The central pivot connection 518 between the first and second front cross braces 510 and 560 is made at substantially the midpoints of the first and second cross braces 510 and 560. In other words, the lengths of the front cross braces from the central pivot connection 518 to the respective ends 512 and 516, and 562 and 566 of each brace are in the preferred embodiment substantially equal.

The pivot connection 518 between the first and second cross braces 510 and 560 may also be provided with protective and/or ornamental covers. Referring to FIG. 2, front cover 502 is joined to front cross brace 560 with suitable fasteners such as rivets or screws. Referring to FIG. 3, and in like manner, rear cover 504 is joined to front cross brace 510, also with suitable fasteners such as rivets or screws. Rivet 518 may pass through front cover 502, second front cross brace 560, first front cross brace 510, and rear cover 504.

Referring in particular to FIG. 8B, the first and second rear cross braces 610 and 660 of the rear leg collapsing assembly 600 are also rigid, and define a rear cross brace plane, which includes the first and second cross braces 510 and 560. The first and second rear cross braces 610 and 660 may also be formed from tubular members, wherein at the central pivot connection regions 614 and 664 thereof, the tubular members are flattened, thereby facilitating the pivot connection and operation between them. The first and second rear cross braces may also be formed into slight S-shapes, so as to provide a greater angle of rotation between them, thereby providing a greater degree of collapsibility of the walker apparatus. First rear cross brace 610 is formed comprising upper bend 611 and lower bend 619, and second cross brace 660 is formed comprising upper bend 661 and lower bend 669.

The central pivot connection 618 between the first and second rear cross braces 610 and 660 is made toward the upper ends 612 and 662 of the first and second cross braces 610 and 660, i.e. in the preferred embodiment, the lengths of the cross braces from the central pivot connection 618 to the respective upper ends 612 and 662 of each brace are shorter than the lengths of the cross braces from the central pivot connection 618 to the respective lower ends 616 and 666 of each brace.

The pivot connection 618 between the first and second rear cross braces 610 and 660 may also be provided with protective and/or ornamental covers. Referring to FIG. 2, front cover 602 is joined to rear cross brace 610 with suitable fasteners such as rivets or screws. Referring to FIG. 3, and in like manner, rear cover 604 is joined to rear cross brace 660, also with suitable fasteners such as rivets or screws. Rivet 618 may pass through front cover 602, first rear cross brace 610, second rear cross brace 660, and rear cover 604.

Sliding joints 200 and 250, front couplings 113 and 163, and rear couplings 413 and 463 may be made of a high strength engineering grade polymer such as acrylonitrile-butadiene-styrene copolymer (ABS), polycarbonate (PC) or polyethylene terephthalate (PET); or glass or carbon fiber reinforced polymers.

Figure 16:
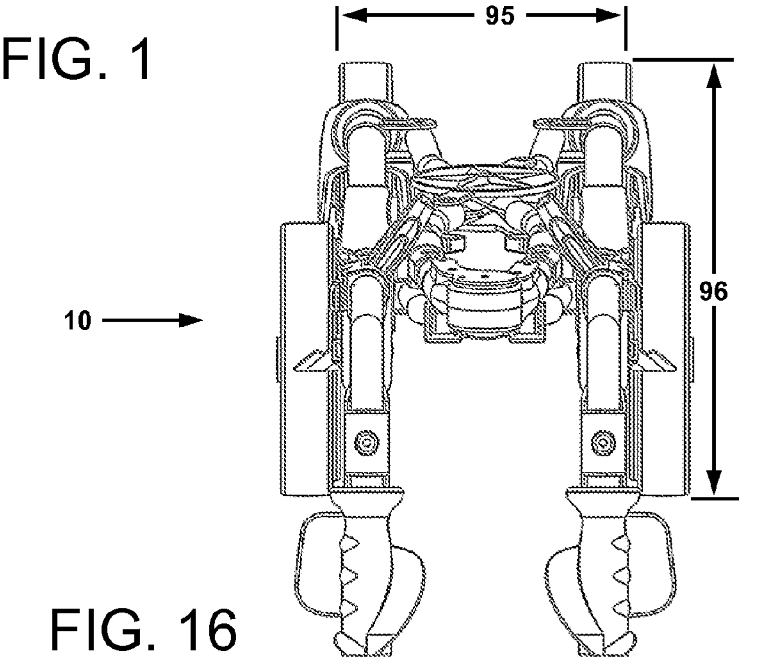
FIG. 16 is a top view of the applicant's walker apparatus as viewed in FIG. 1, but with the walker apparatus fully collapsed.
Figure 11:
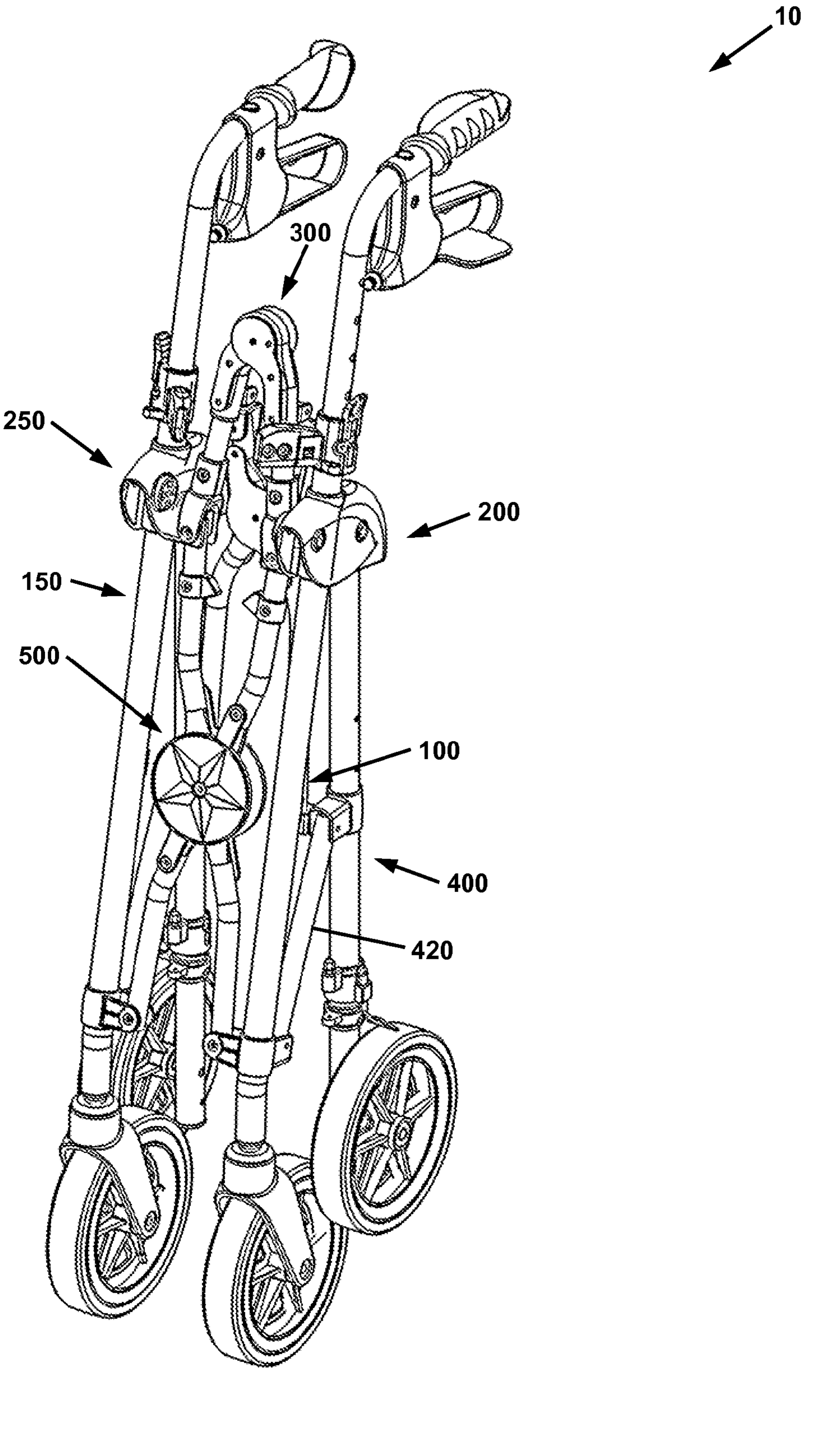
FIG. 11 is a front left perspective view of the applicant's walker apparatus as viewed in FIG. 2, but with the walker apparatus fully collapsed.
Figure 12:
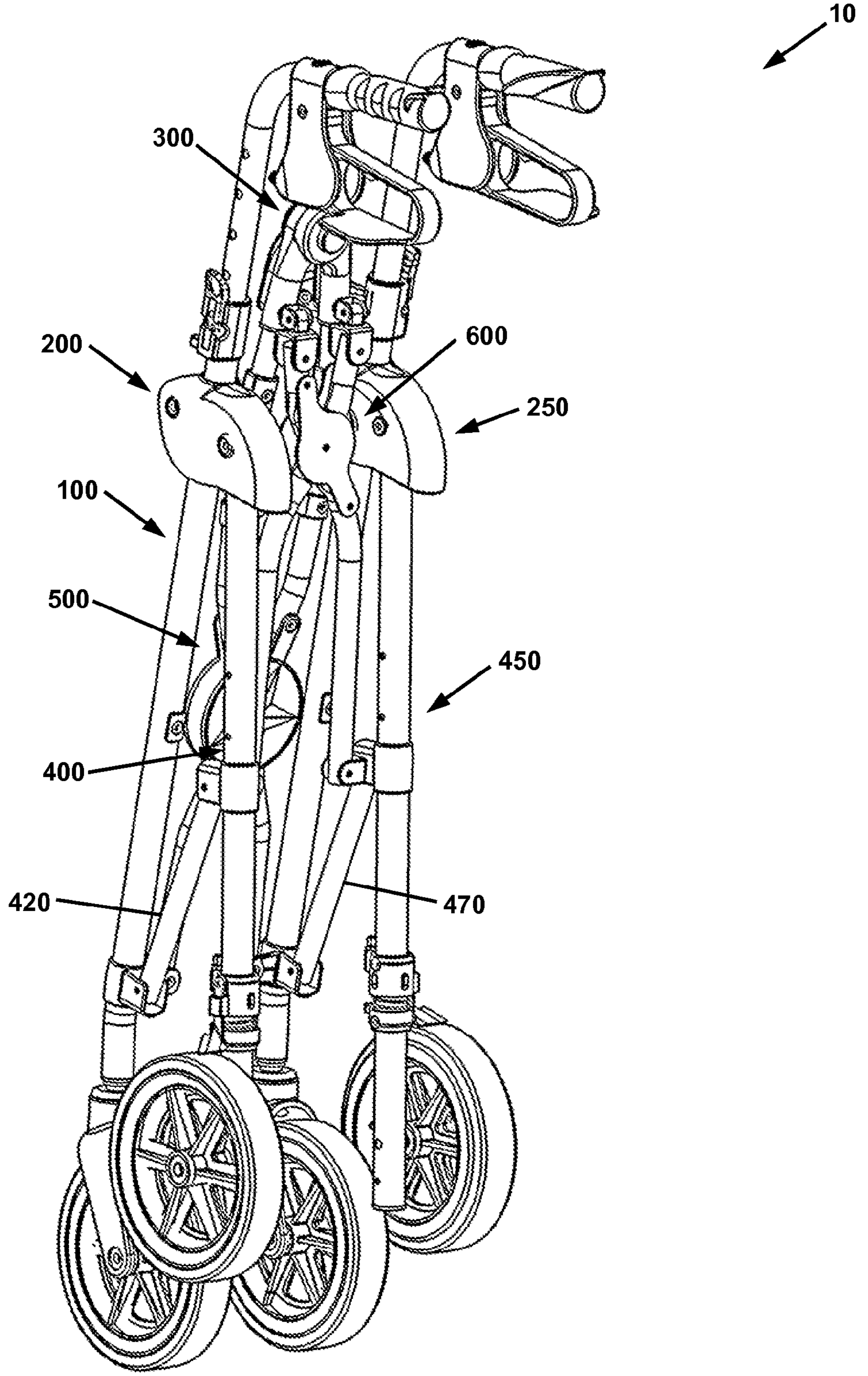
FIG. 12 is a rear left perspective view of the applicant's walker apparatus as viewed in FIG. 3, but with the walker apparatus fully collapsed.
Figure 13:
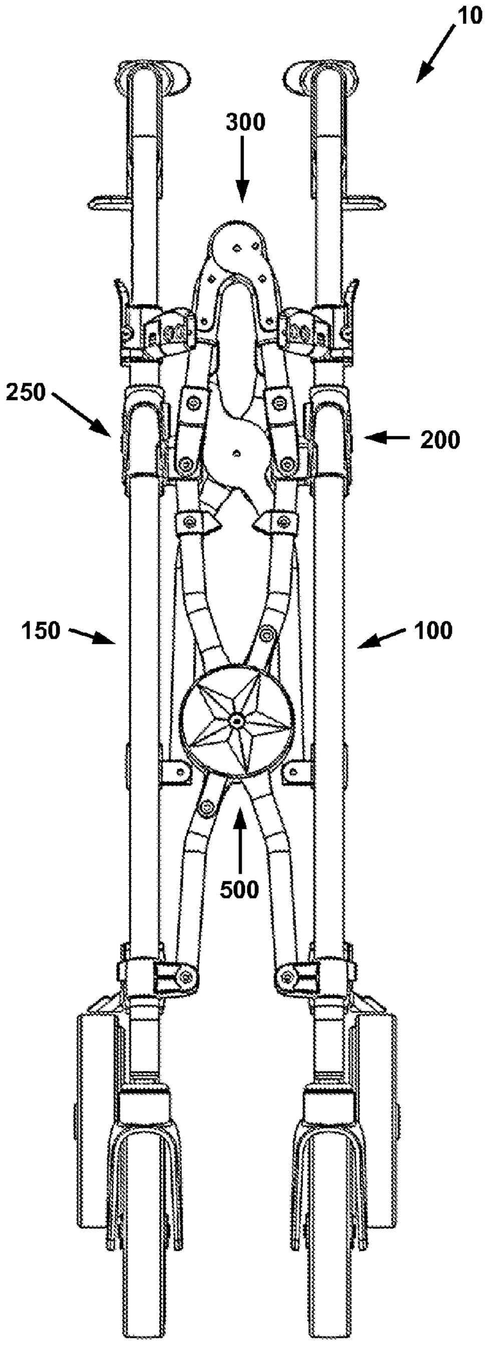
FIG. 13 is a front elevation view of the applicant's walker apparatus as viewed in FIG. 4, but with the walker apparatus fully collapsed.
Figure 14:
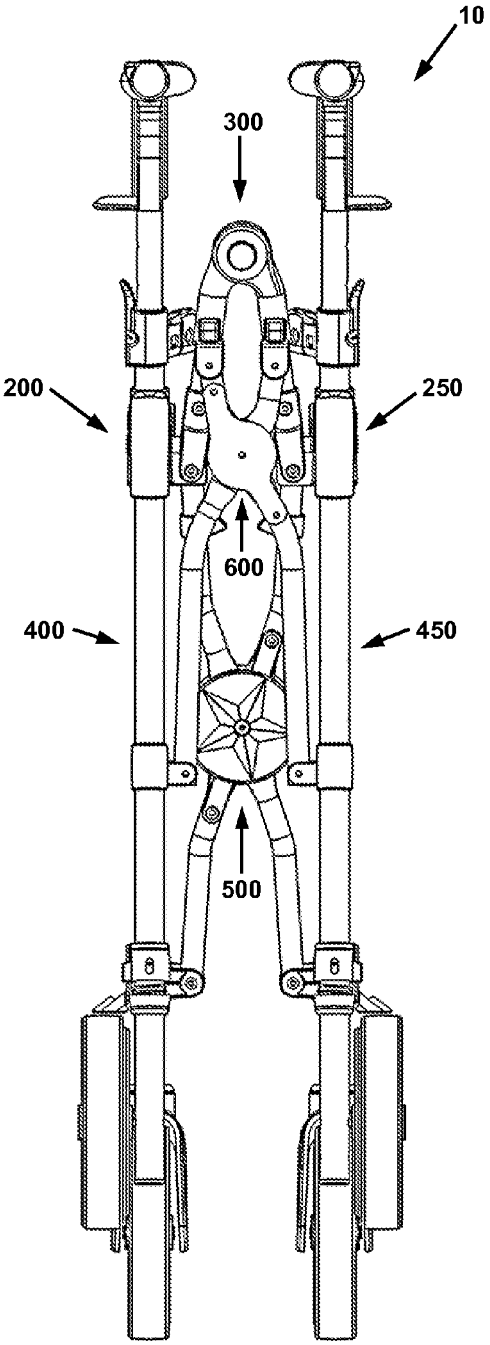
FIG. 14 is a rear elevation view of the applicant's walker apparatus as viewed in FIG. 5, but with the walker apparatus fully collapsed.
Figure 15:
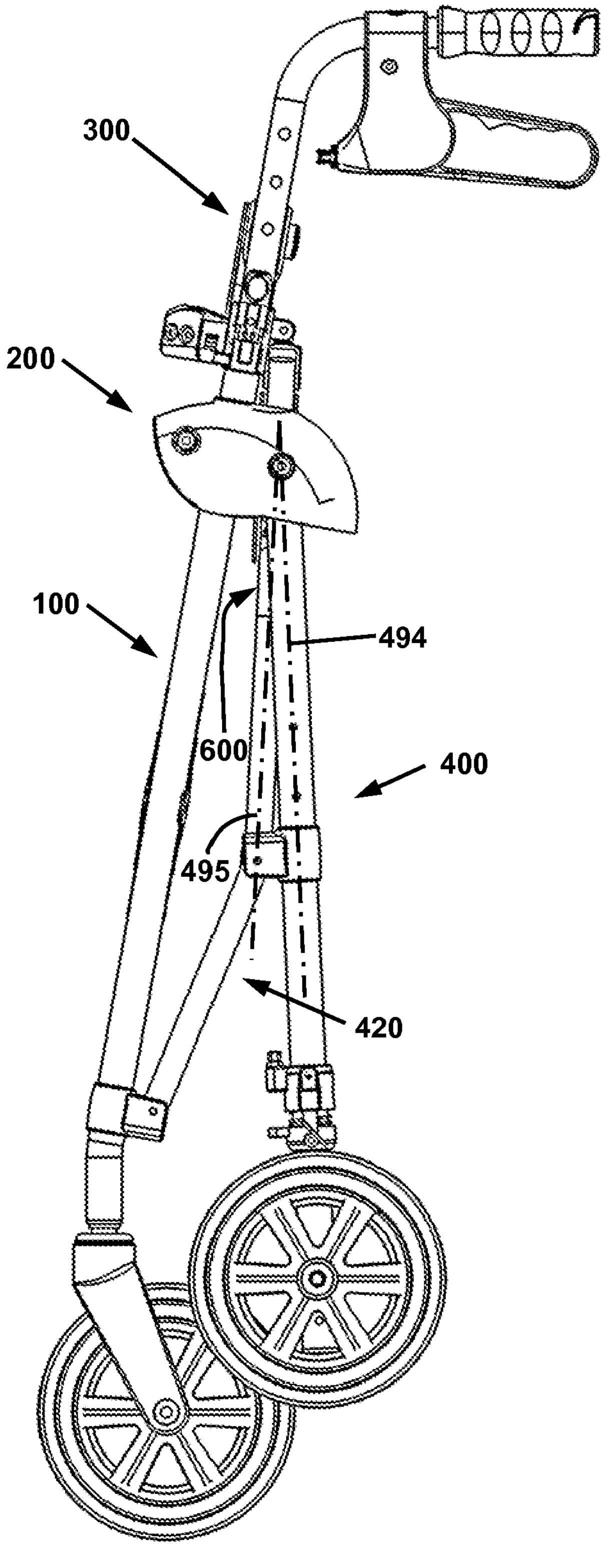
FIG. 15 is a left side elevation view of the applicant's walker apparatus as viewed in FIG. 6, but with the walker apparatus fully collapsed.

The manner in which the applicant's walker apparatus can be collapsed into a highly compact shape will now be described. FIGS. 11-16 are views of the applicant's walker apparatus in the collapsed state as follows: FIG. 11 is a front left perspective view; FIG. 12 is a rear left perspective view; FIG. 13 is a front elevation view; FIG. 14 is a rear elevation view; FIG. 15 is a left side elevation view; and FIG. 16 is a top view of the walker apparatus in the collapsed state. The collapsing of walker apparatus 10 is also best understood with reference in particular to FIGS. 6, 8A, and 8B.

To initiate the collapsing of the walker 10 in a single continuous motion from the open state depicted in FIGS. 6, 8A, and 8B, to the collapsed, or "closed" state depicted in FIGS. 11-16, a person (e.g. the user, or an, assistant) grips the central region of the central hinge joint 300, i.e. the inner ends 322 and 372 of first arm 310 and second arm 360 of central hinge joint 300. Gripping central hinge joint 300 in this manner, the person (not shown) pulls upwardly on central hinge joint 300 in the direction indicated by arrow 399 in FIGS. 8A and 8B. Related movements occur in various subassemblies of the apparatus 10 to effect the continuous collapsing motion, the related movements including the following:

A. First arm 310 and second arm 360 of central hinge joint 360 pivot with respect to each other as the inner ends 322 and 372 of joint 360 are moved upward. First arm 310 and second arm 360 are moved inwardly and upwardly, as indicated by arcuate arrows 398 and 397. When apparatus 10 is collapsed as shown particularly in FIGS. 11, 13, and 14, central hinge joint 300 is transformed to an inverted "V" configuration.

B. First sliding joint 200 slides upwardly along the central region 106 of elongated member 102 of first front support leg assembly 100, as indicated by arrow 299. Second sliding joint 250 slides upwardly along the central region 156 of elongated member 152 of second front support leg assembly 150, as indicated by arrow 298.

C. The first front cross brace 510 and the second front cross brace 560 of front leg collapsing assembly 500 pivot with respect to each other about their central pivot connection regions 514 and 564 joined by rivet 518, as indicated by arcuate arrows 599, 598, 597, and 596. When apparatus 10 is collapsed as shown particularly in FIGS. 11 and 13, front leg collapsing assembly 500 is transformed from a short and wide "X" configuration to a tall and narrow "X" configuration.

D. The first rear cross brace 610 and the second rear cross brace 660 of rear leg collapsing assembly 600 pivot with respect to each other about their central pivot connection regions 614 and 664 joined by rivet 618, as indicated by arcuate arrows 699, 598, 697, and 596. When apparatus 10 is collapsed as shown particularly in FIGS. 12 and 14, rear leg collapsing assembly 600 is also transformed from a short and wide "X" configuration to a tall and narrow "X" configuration.

E. First front leg assembly 100 and second front leg assembly 150 move toward each other as indicated by arrows 199, 198, 197, 196, 195, and 194. The first and second front cross braces 510 and 560 of the front leg collapsing assembly 500 define a front leg collapsing plane, which includes the first and second front support leg elongated members 102 and 152. When walker 10 is in the open position, first and second support leg elongated members 102 and 152 are in the front leg collapsing plane, and during the collapsing of walker apparatus 10, and after walker apparatus 10 is collapsed as shown in FIGS. 11-16, first and second support leg elongated members 102 and 152 remain in the front leg collapsing plane. When apparatus 10 is collapsed as shown particularly in FIG. 13, first and second front support leg assemblies 100 and 150 remain parallel to each other, but are considerably closer to each other than when apparatus 10 is open as depicted in FIG. 4.

F. First rear support leg assembly 400 and second rear support leg assembly 450 move toward each other as indicated by arrows 499, 498, 497, and 496. When apparatus 10 is collapsed as shown particularly in FIG. 14, first and second rear support leg assemblies 400 and 450 remain parallel to each other, but are considerably closer to each other than when apparatus 10 is open as depicted in FIG. 5.

G. The first and second rear cross braces 610 and 660 of the rear leg collapsing assembly 600 define a rear cross brace plane, which includes first and second rear cross braces 610 and 660. First rear support leg assembly 400 and second rear support leg assembly 450 define a rear support leg plane. Referring to FIG. 6, rear cross brace plane is indicated by broken line 495, and rear support leg plane is indicated by broken line 494. During the collapsing of walker apparatus 10, when sliding joint 200 slides upwardly as indicated by arrow 299, upper end 408 of first rear support leg 400 moves as indicated by arcuate arrow 493. First support member 420 pivots upwardly as indicated by arcuate arrow 493, and rear cross brace assembly 600 and rear support leg assembly 400 pivot towards front support leg assembly 100 as indicated by arcuate arrows 491 and 490, respectively. In like manner, second rear support leg assembly 450 pivots toward second front support leg 150. Accordingly, rear cross brace plane 495 and rear support leg plane 494 pivot toward front support leg assembly 100. It can be seen that when apparatus 10 is in the open position as shown in FIG. 6, rear cross brace plane 495 and rear support leg plane 494 are approximately parallel to each other. However, when apparatus 10 is in the collapsed position as shown in FIG. 15, rear cross brace plane 495 may become slightly angled with respect to rear support leg plane 494. This is enabled by the action of the universal joints 620 and 670 that are joined to arms 310 and 360 of central hinge joint 300 and to the upper ends 612 and 662 of first and second rear cross braces 610 and 660, respectively. In a further embodiment, both first and second rear cross braces 610 and 660 may be provided with universal joints at their respective lower ends 616 and 666, which connect such braces to rear couplings 413 and 463, respectively to more easily enable the change in alignment of planes 495 and 494 with respect to each other, without placing significant stresses on the various components of the rear leg assemblies 400 and 450, and the rear cross brace assembly 600. It is to be understood that it is not necessary to the function of the apparatus 10 that there exist an angle between the plane of the rear collapsing members and the plane of the rear leg assemblies when the apparatus is in the collapsed position. Such a condition may occur, depending upon the precise geometry and attachment points of the cross braces 610 and 660 of the rear leg collapsing assembly 600.

It can be seen that the apparatus 10 can be folded into a very compact shape in a single simultaneous motion of the various subassemblies, and that such folding is enabled by the dual fold mechanism of the apparatus. In other words, the apparatus simultaneously has dual folding action, which also may be described as bi-directional, enabled by the cross-brace assemblies, wherein the front support leg assemblies 100 and 150 are brought toward each other, and the rear support leg assemblies 400 and 450 are brought toward each other; and the rear support leg assemblies 400 and 450 are simultaneously folded toward the front support leg assemblies 100 and 150. In effect all four of the leg assemblies move towards each other in a continuous and apparently fluid motion. This benefits the user of apparatus 10 by providing the apparatus with simplicity, ease of operation and compactness for storage, carrying, or transportation.

In this manner, the apparatus 10 undergoes a significant reduction in its "footprint" when collapsed, i.e. the length and width of the apparatus when it is collapsed. This is best understood with reference to FIGS. 1 and 16. In one embodiment, apparatus 10 has a length 98 of about 22 inches and a width 97 of about 22 inches when in the open position; and a length 96 of 10 inches and a width 95 of 9.5 inches when in the collapsed position, a reduction of about 80 percent. (It is to be understood that the length of the handgrips of apparatus 10 are not included in the collapsed length dimension 96, as such handgrips are easily detached from the apparatus.)

Apparatus 10 may also comprise several mechanical stops, such that when the apparatus 10 is placed in the open state, the stops provide additional structural support, and prevent certain parts from moving beyond their intended positions when apparatus 10 is opened. Such stops are best understood with reference to FIGS. 3 and 8B. Stops 513 and 563 are provided as collars on the upper ends 512 and 562 of front cross brace members 510 and 560, and are secured thereto by a rivet, screw, adhesive, or other suitable fastening means. When apparatus 10 is opened, center branch 317 of yoke 314 of first arm 310 comes into contact with stop 513. In like manner, center branch 367 of yoke 364 of second arm 360 comes into contact with stop 563. Thus the travel of central hinge joint 300 is limited when apparatus 10 is opened, and the load upon walker 10 is more evenly distributed throughout the leg and cross brace assemblies.

Stops may also be provided on leg assemblies 100 and 150 to limit the downward travel of sliding joints 200 and 250 on such leg assemblies. Stops 103 and 153 are provided as rectangular tabs of material attached to the central regions 106 and 156 of elongated leg members 102 and 152 by rivets, screws, adhesive, or other suitable fastening means. When apparatus 10 is opened, sliding joint 200 comes into contact with stop 103 (see also FIGS. 7A and 7B.) In like manner, when apparatus 10 is opened, sliding joint 250 comes into contact with stop 153. Thus the travel of sliding joints 200 and 250 are limited when apparatus 10 is opened.

Additional features and/or optional components of the applicant's walker apparatus will now be described.

Figure 17A:
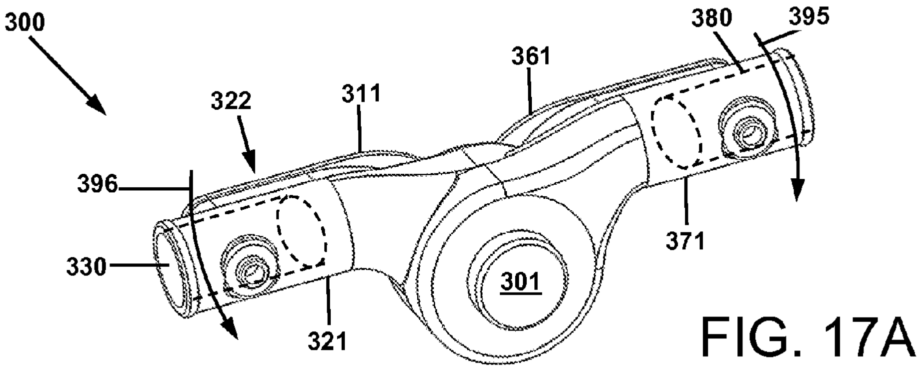
FIG. 17A is an assembled front perspective view of the central hinge joint of the applicant's walker apparatus.
Figure 17B:
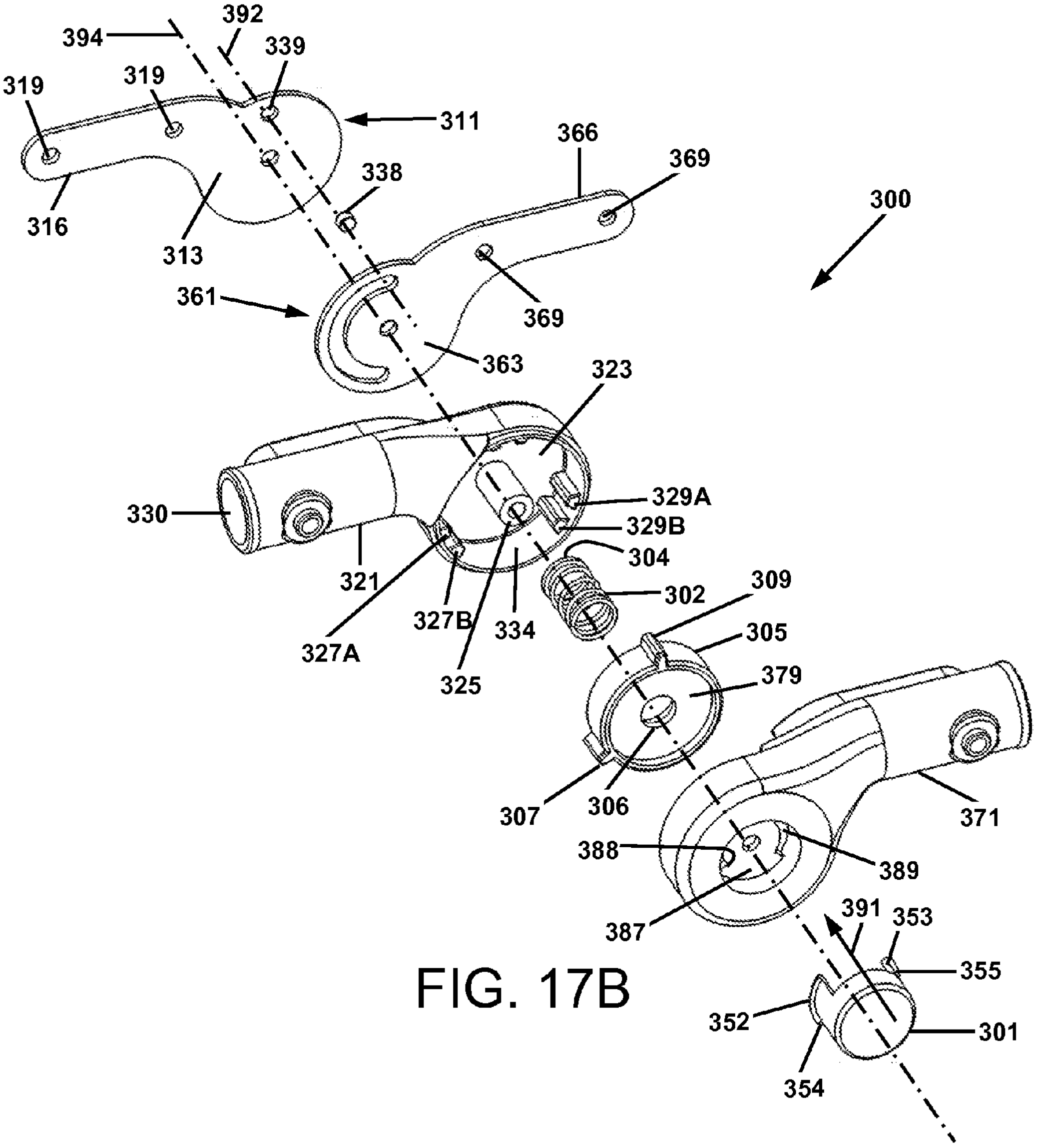
FIG. 17B is an exploded front perspective view of the central hinge joint of FIG. 17A.
Figure 17C:
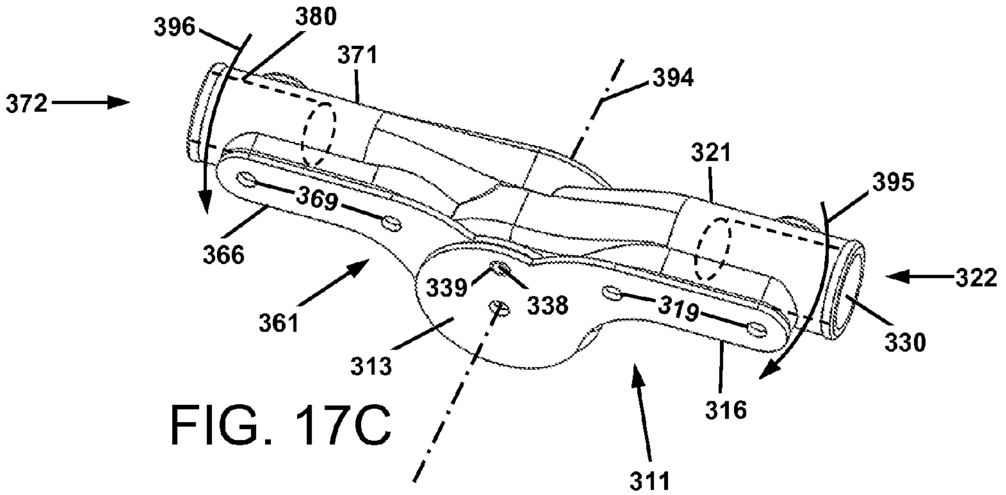
FIG. 17C is an assembled rear perspective view of the central hinge joint of FIG. 17A.
Figure 17D:
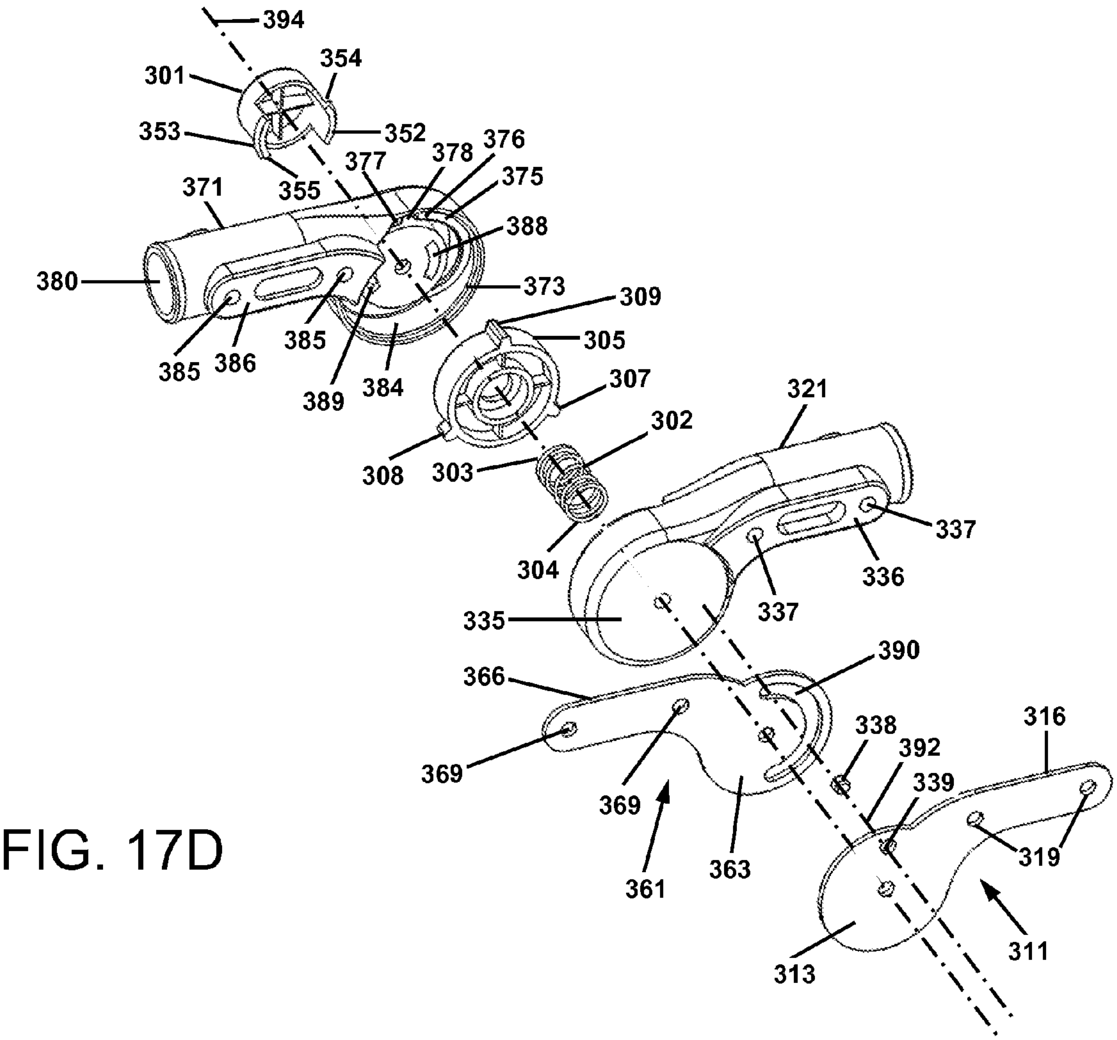
FIG. 17D is an exploded rear perspective view of the central hinge joint of FIG. 17A.
Figure 17E:
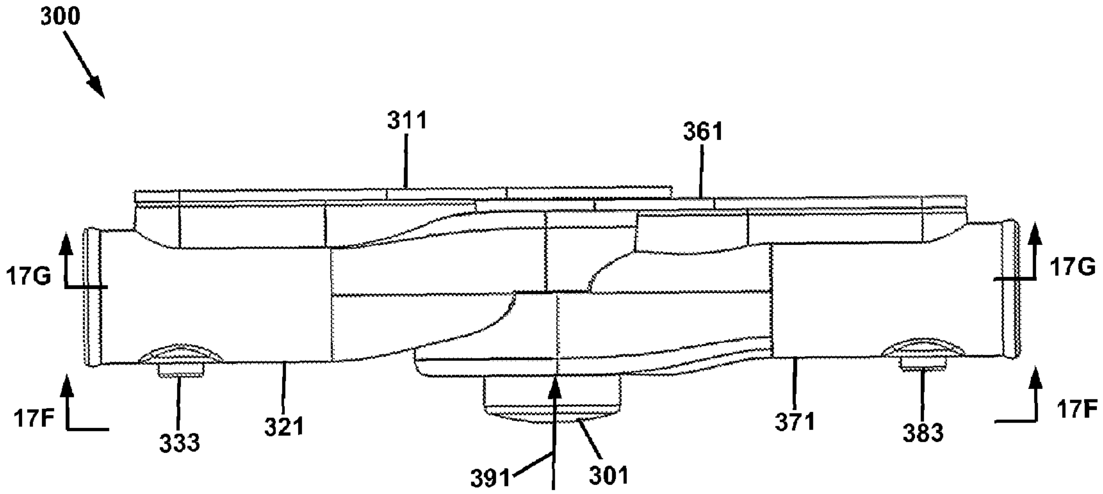
FIG. 17E is a top view of the central hinge joint of FIG. 17A.
Figure 17F:
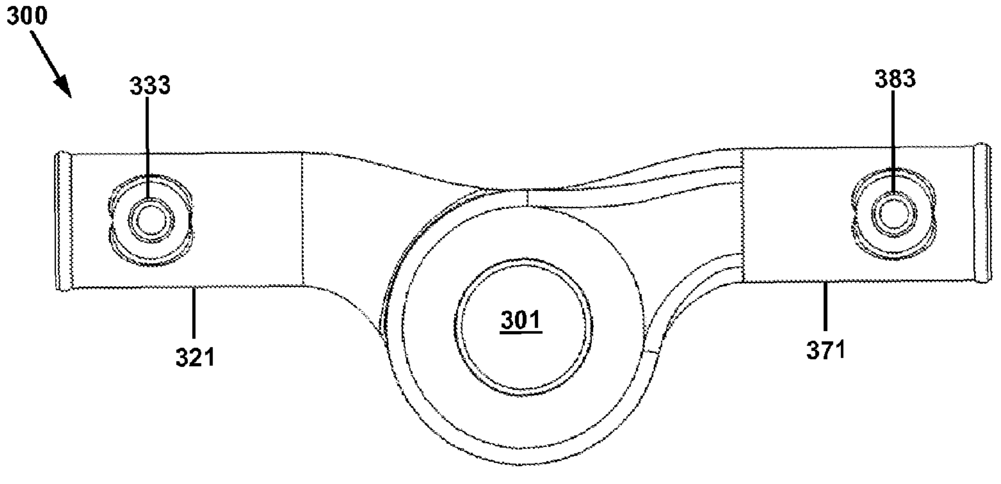
FIG. 17F is a front elevation view of the central hinge joint of FIG. 17E, take along line 17F-17F of FIG. 17E.
Figure 17G:
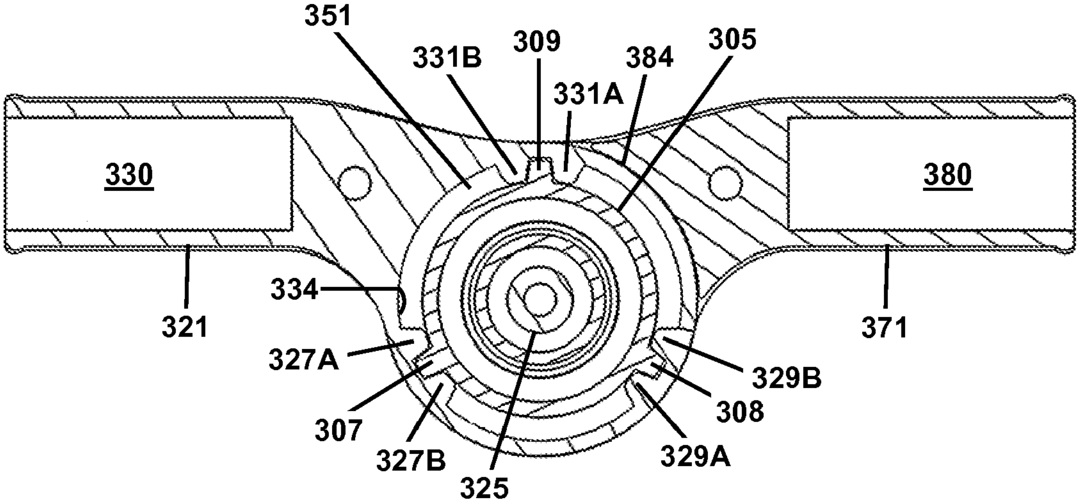
FIG. 17G is a front cross-sectional view of the central hinge joint of FIG. 17E in the open position, taken along line 17G-17G of FIG. 17E.
Figure 17H:
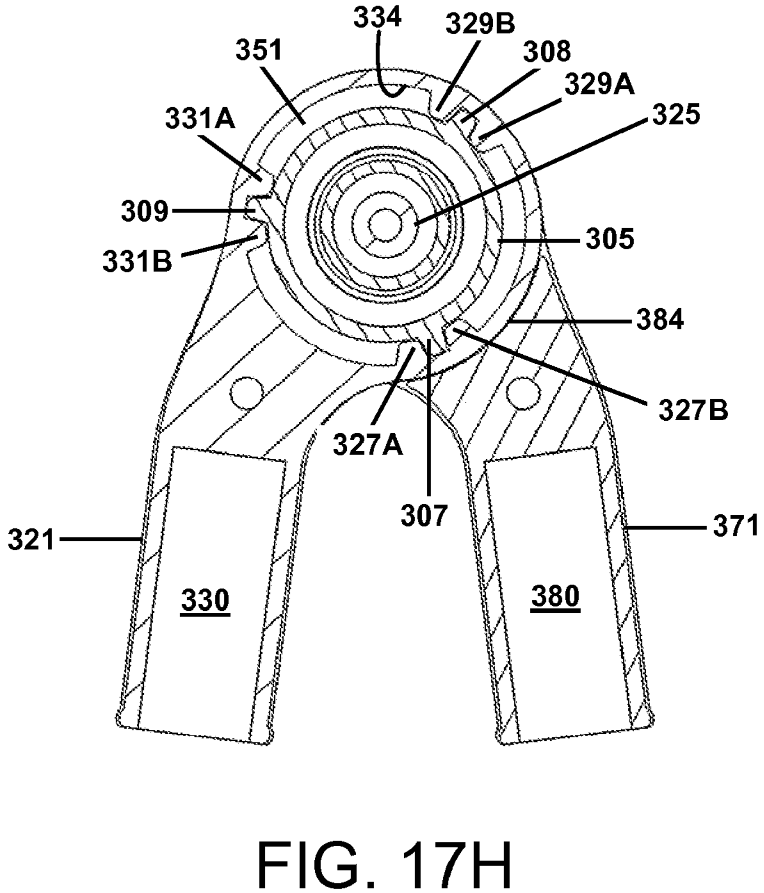
FIG. 17H is a front cross-sectional view of the central hinge joint of FIG. 17E in the closed position.

One main function of the central hinge joint 300 is to provide a structural support that defines the distance between the front support leg assemblies 100 and 150, and the rear support leg assemblies 400 and 450, and rigidly holds the support leg assemblies at that separation distance when the apparatus is in the open position. Another main function is to provide a hinge mechanism for bringing the support leg assemblies toward each other when the apparatus is collapsed, and for holding the upper ends 612 and 662 of the rear cross braces 610 and 660, and actuating rear cross brace assembly 600 in a scissor-like action when the apparatus 10 is collapsed. A relatively simple hinge joint mechanism as described up to this point will suffice in providing such functions in apparatus 10. However, central hinge joint 300 may be provided with further capabilities, which are advantageous to the use of walker apparatus 10. Such a hinge joint 300 is illustrated in FIGS. 17A-G, wherein FIG. 17A is an assembled front perspective view of one central hinge joint of the applicant's walker apparatus; FIG. 17B is an exploded front perspective view of the central hinge joint of FIG. 17A; FIG. 17C is an assembled rear perspective view of the central hinge joint of FIG. 17A; FIG. 17D is an exploded rear perspective view of the central hinge joint of FIG. 17A; FIG. 17E is a top view of the central hinge joint of FIG. 17A; FIG. 17F is a front elevation view of the central hinge joint of FIG. 17E, take along line 17F-17F of FIG. 17E; and FIG. 17G is a front cross-sectional view of the central hinge joint of FIG. 17E in the open position, taken along line 17G-17G of FIG. 17E; and FIG. 17H is a front cross-sectional view of the central hinge joint of FIG. 17E in the closed position.

Referring first to FIG. 17A, central hinge joint 300 may be provided as a locking hinge joint, wherein central hinge joint 300 locks in the open position, thereby rendering the walker apparatus 10 more rigid and secure when in the open position. The central hinge joint may be made lockable by the use of a twist lock mechanism, or a spring loaded actuating button 301. Referring also to FIGS. 17B-17H, the first arm 310 of the locking hinge joint 300 comprises an inner end 322 formed as a first housing half 321, and the second arm 360 comprises an inner end 372 formed as a second housing half 371. First and second housing halves 321 and 371 are pivotably or hingably joined to each other, in order to provide the hinging action with respect to each other as indicated by arcuate arrows 396 and 395 around central axis 394 during collapsing of the apparatus 10.

Central hinge joint 300 further comprises a spring 302 including a first end 303 and a second end 304, and a gear 305, a first housing plate 311, and a second housing plate 361. First housing half 321 include a gear socket 323, and second housing half 371 includes a gear socket 373, such that when first housing half 321 and second housing half 371 are hingably attached to each other, a cavity 351 is formed by the mated gear sockets 323 and 373, thereby forming a housing for toothed gear 305. Toothed gear 305 is formed with a center hole 306, and first housing half 321 is provided with a stub shaft 325. when central hinge joint 300 is assembled, toothed gear 305 is fitted upon stub shaft 325 through center hole 306, such that toothed gear 305 is rotatable around stub shaft 325.

The cavity 351 further includes paired stops 327A and 327B, 329A and 329B, and 331A and 331B formed on the inner wall 334 of gear socket 323. Gear 305 is further comprised of gear teeth 307, 308, and 309 formed on the perimeter thereof. Gear tooth 307 is engaged with paired stops 327A and 327B; gear tooth 308 is engaged with paired stops 329A and 329B; and gear tooth 309 is engaged with paired stops 331A and 331 B.

Additionally, second housing half 371 further includes a button socket 387, for housing the actuating button 301. Button socket 387 includes a first slot 388 and a second slot 389, through which are disposed tabs 352 and 353 of button 301 when hinge joint 300 is assembled. Tabs 352 and 353 are provided with flared edges 354 and 355 to make a snap fit of such tabs within slots 388 and 389.

Gear socket 373 of housing half 371 is provided with a ramp 375 formed along the inner wall 384 of gear socket 373 and extending from approximately the five o'clock position to the 12 o'clock position of inner wall 384. Gear socket 373 is further provided with a stop 377 formed on inner wall 384, such that the upper edge 376 of ramp 375 and stop 377 form a notch 378 along inner wall 384 at the 12 o'clock position of inner wall 384.

As indicated previously, gear teeth 307, 308, and 309 are engaged with the three paired stops 327A/B, 329A/B, and 331A/B of housing half 321. This is true regardless of whether joint 300 is in the open position, the closed position, or in between the open and closed position. Additionally, when joint 300 is in the open position, button 301 is in the "out" position, best depicted in FIG. 17E, and spring 302 is pushing on gear 305 such that tooth 309 is engaged with notch 378 formed in housing half 371. Thus, when central locking joint 300 is in the open position, teeth 307-309 of gear 305 are engaged with housing half 321, and tooth 309 is simultaneously engaged with notch 378 in housing half 371 such that central locking joint 300 is locked open.

To release central locking joint 300 from the locked open position, button 301 is depressed as indicated by arrow 391 in FIGS. 17B and 17E. Tabs 352 and 353 of button 301, which are in contact with surface 379 of gear 305, push against gear 305, thereby moving gear 305 axially in the direction of arrow 391 and compressing spring 302, which is in contact with housing half 321 and gear 305. When gear 305 is thus moved axially, tooth 309 is disengaged with notch 378 formed in housing half 371. Housing halves 321 and 371 are thus free to pivot with respect to each other from the open position depicted in FIG. 17G to the collapsed or closed position in FIG. 17H. Gear 305, which remains engaged with housing half 321, rotates with housing half 321. Tooth 309 slides along the sloped surface of ramp 375 in a camming action.

When the walker apparatus 10 is deployed from a collapsed position to an open position, and central locking joint 300 transitions from the closed position of FIG. 17H to the open position of FIG. 17G, tooth 309 slides up the sloped surface of ramp 375, until tooth 309 reaches notch 378. Tooth 309 then engages with notch 378 as gear 305 is driven axially in the direction opposite that of arrow 391 by the force of compressed spring 302. An audible click is heard by the user, helping to indicate that central locking joint 300 has locked in the open position.

In the embodiment of central locking joint 300 depicted in FIGS. 17B and 17D, tooth 308 of gear 300 is provided with a shorter length in the axial direction than either tooth 309 or tooth 307. This is done so that tooth 308 does not interfere with stop 377 during the motion of joint 300 from the open position to the closed position.

Referring to FIGS. 17C and 17D in particular, on the side of the locking hinge joint 300 that is opposite the side including the actuating button 301, locking hinge joint 300 further comprises alignment plates joined to each of the first and second housing halves 321 and 371, such plates being pivotably engaged with each other. First housing half 321 is provided with a flat circular boss 335 and a flat arm boss 336, and second housing half 321 is provided with a flat arm boss 386. The circular central region 363 of alignment plate 361 is disposed upon flat circular boss 335 of first housing half 321 and the arm region 366 of alignment plate 361 is operatively joined to flat arm boss 386 of second housing half 371 by suitable fasteners (not shown) such as rivets or screws passing through holes 369 in arm region 366 of alignment plate 361, and engaging with holes 385 in flat arm boss 386. In like manner, the circular central region 313 of alignment plate 311 is disposed upon the circular central region 363 of alignment plate 361, and the arm region 316 of alignment plate 311 is operatively joined to flat arm boss 336 of second housing half 321 by suitable fasteners (not shown) such as rivets or screws passing through holes 319 in arm region 316 of alignment plate 361, and engaging with holes 337 in flat arm boss 336.

When central hinge joint 300 is operated, central circular region 363 of alignment plate 361 rotates between flat circular boss 335 of first housing half 321 and central circular region 313 of alignment plate 311. Flat arm boss 336 of first housing half 321 is raised above circular central region 335 of first housing half 321 by a distance just slightly greater than the thickness of second alignment plate 361, thereby providing a gap between circular central region 335 of first housing half 321 and central circular region 313 of alignment plate 311 within which central circular region 363 of alignment plate 361 rotates.

Central hinge joint 300 may be further provided with a short pin 338 that is press fit into hole 339 in alignment plate 311 as indicated by broken line 392. Short pin 338 protrudes into arcuate slot 390 of alignment plate 361, and when central hinge joint 300 is operated, short pin 338 slides along an arcuate path within arcuate slot 390, thereby helping to maintain the alignment of the components of central hinge joint 300. The complete joint assembly may be held together by a rivet or a screw and nut (not shown) extending through the central holes provided in housing half 371, gear 305, spring 302, housing half 321, and plates 361 and 311.

As described previously, the first and second housing halves 321 and 371 may further include sockets 330 and 380 formed therein, within which may be disposed short lengths of tubing 324 and 374 that form or are connected to the outer ends of the first and second arms 310 and 360 (see FIGS. 8A and 8B).

Housing halves 321 and 371 of central locking joint 300 may further be provided with thickened bosses 333 and 383 for a more secure attachment of universal joints 620 and 670 thereto. (See FIG. 8B in particular.) Walker apparatus 10 may optionally be provided with various additional features and accessories to improve its capability for the user. Such additional features and accessories are best understood with reference to FIGS. 2 and 3.

The lower ends 104 and 154 of the front support leg assemblies 100 and 150 may have either soft tips, or castors joined thereto, depending upon the needs of the user of the walker. In like manner, the lower ends 404 and 454 of the rear support leg assemblies 400 and 450 may have glides that are slidable along the ground, soft tips, or wheels. Referring to FIGS. 2 and 3, and in the embodiment depicted therein, walker assembly 10 is provided with front swivel caster assemblies 710 and 760 fitted to front leg assemblies 100 and 150. Walker assembly 10 is further provided with rear wheel assemblies 720 and 770 fitted to rear leg assemblies 400 and 450.

Walker assembly 10 may further include brakes for applying a stopping force to the wheels. in the embodiment depicted in FIGS. 2 and 3, a wheel brake assembly 725 is provided on first rear wheel assembly 720, and a wheel brake assembly 775 is provided on second rear wheel assembly. Braking force on the rear wheels may be applied by the action of hand actuators 732 and 782 that are part of handlebar assemblies 730 and 780. Hand actuators 732 and 782 are connected to brake assemblies 725 and 775 by actuating cables (not shown). The handlebar assemblies 730 and 780 may also include handgrips 734 and 784 for providing a solid grip on apparatus 10 by the user. The upper ends of the front support legs may further include lever-actuated quick release mechanisms 736 and 786, or other suitable means for adjusting the height of the handlebar assemblies 730 and 780 to ergonomically match the height of the user of the walker.

Figure 18:
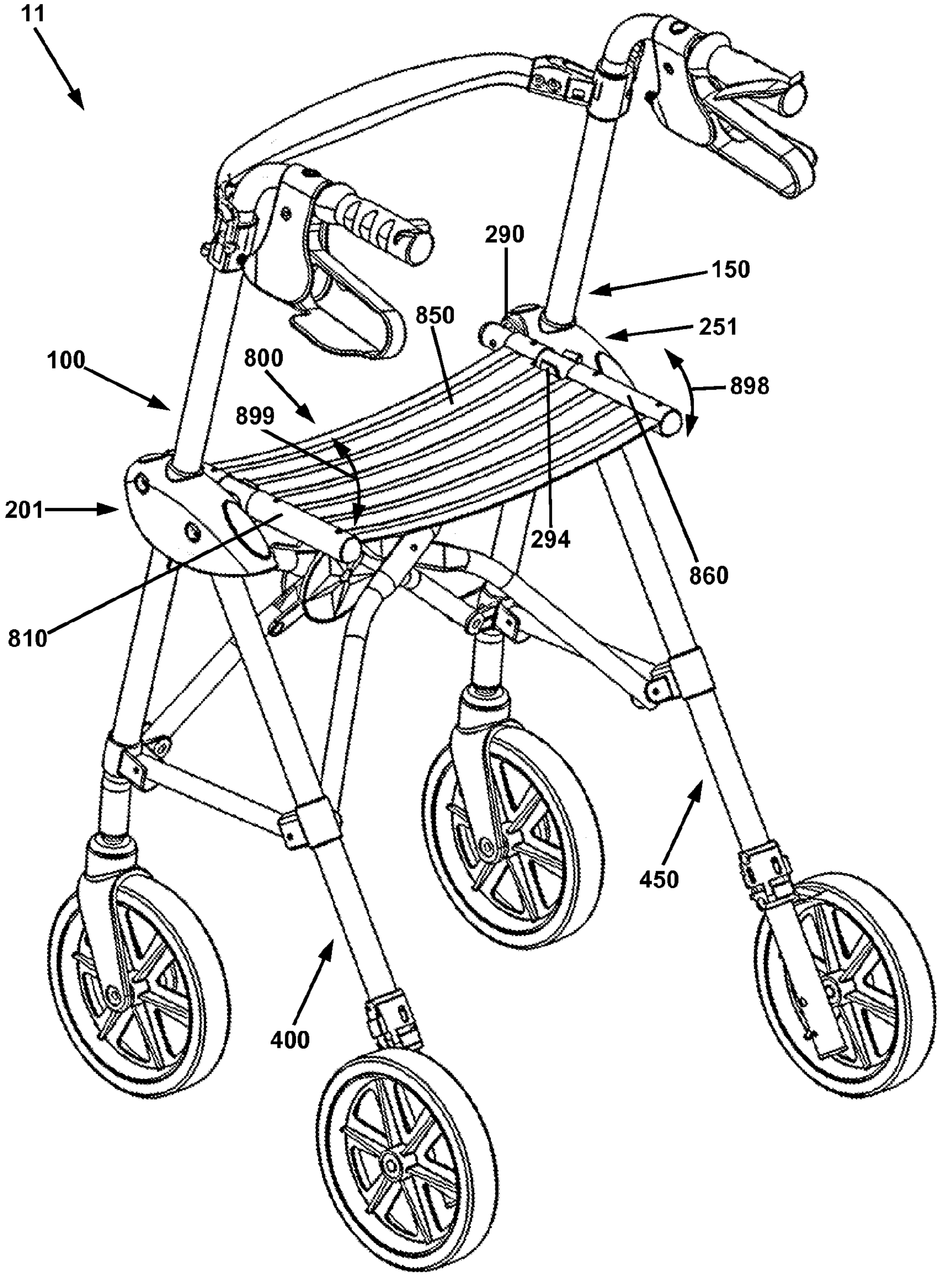
FIG. 18 is a rear left perspective view of an additional embodiment of the applicant's walker apparatus including a fabric seat.
Figure 19A:
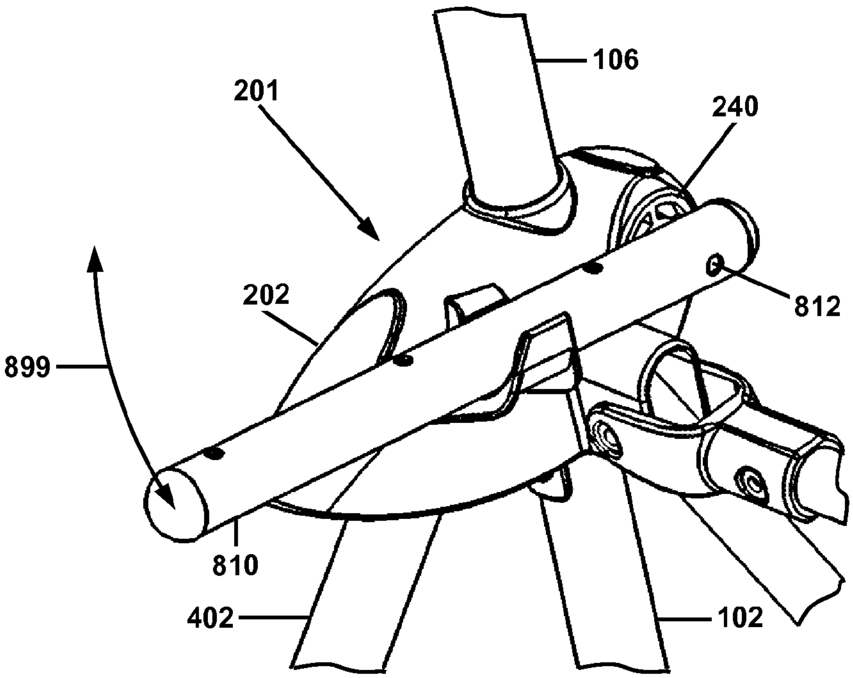
FIG. 19A is detailed inner side perspective view of a sliding joint and a pivotable seat support arm of the walker apparatus, the seat arm shown in the down position.
Figure 19B:
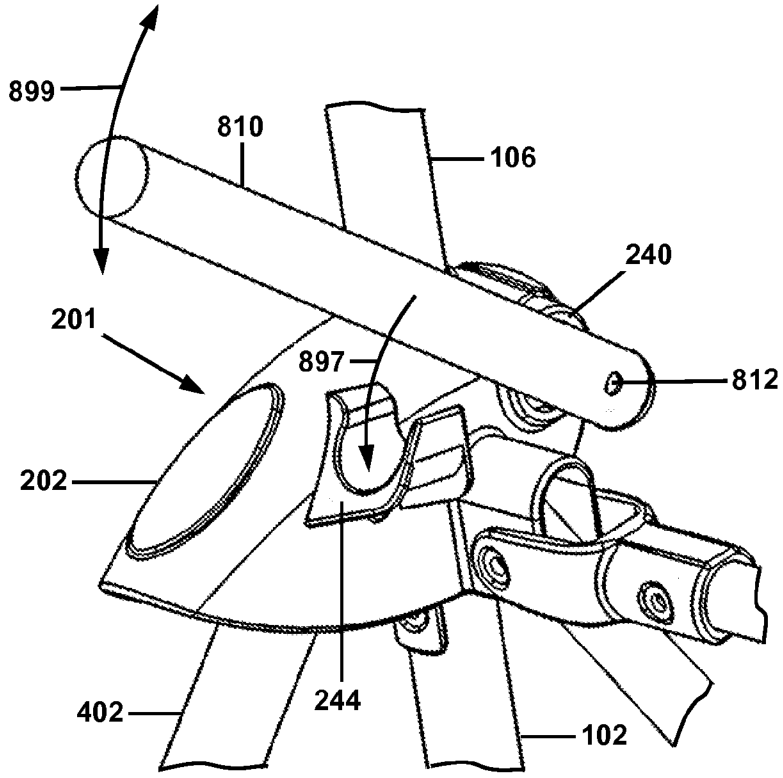
FIG. 19B is detailed inner side perspective view of the sliding joint and pivotable seat support arm as shown in FIG. 19A, but with the seat arm shown in the up position.

Walker assembly 10 may also be provided with a raisable and lowerable seat which may be pivotably attached to the first and second sliding joints 200 and 250. Such an embodiment is best understood with reference to FIGS. 18-19B. FIG. 18 is a rear left perspective view of an additional embodiment of the applicant's walker apparatus including a fabric seat; FIG. 19A is detailed inner side perspective view of a sliding joint and a pivotable seat support arm of the walker apparatus, the seat arm shown in the down position; and FIG. 19B is detailed inner side perspective view of the sliding joint up position.

Apparatus 11 of FIG. 18 is similar to apparatus 10 of FIGS. 1-16, and further comprises seat assembly 800. Seat assembly 800 is comprised of a first seat arm 810 pivotably joined to first sliding joint 201, a second seat arm pivotably joined to second sliding joint 251, and a fabric web 850 that is joined to first seat arm 810 and second seat arm 860. First seat arm 810 is pivotably joined to sliding joint 201 at seat post pivot boss 240 (see also FIGS. 7A and 7B) by a rivet or threaded fastener (not shown) that is engaged with hole 242 in boss 240. In like manner, second seat arm 860 is pivotably joined to sliding joint 251 at seat post pivot boss 290 in sliding joint 251. Fabric web 850 is joined to each of seat arms 810 and 860 by being wrapped around arms 810 and 860 and sewn to itself, or by suitable fasteners (not shown) which pass through the web and are secured to arms 810 and 860.

Seat assembly 800 is pivotable with respect to sliding joints 201 and 251 as indicated by bidirectional arrows 899 and 898, through an arc of up to about 180 degrees. In this manner, seat assembly may be positioned in an optimal position for the collapsing of walker assembly 11, when assembly 11 is collapsed as described previously herein for walker assembly 10.

When seat assembly 800 is in the lowered position, and is ready to be used as a seat by the user of the walker, seat assembly 800 may be supported by suitable support means, which support each of seat arms 810 and 860. Referring to FIGS. 19A and 19B, and in one embodiment depicted therein, sliding joint 201 is provided with a U-shaped support hook 244, which is dimensioned to receive and support seat arm 810 as indicated by arrow 897. Support hook 244 may be integrally formed as part of sliding joint 201, or support hook 244 may be formed separately and joined to the shell 202 of sliding joint 201 by suitable means such as adhesive, or one or more fasteners (not shown). In like manner, sliding joint 251 is provided with a corresponding support hook 294 for supporting seat arm 860.

Seat arms 810 and 860 are rigid elongated members, and may be formed as tubular members, fabricated from a metal such as steel or aluminum. Alternatively, the tubular members may be made of engineering grade plastic resins or composite materials, such as a glass or carbon fiber reinforced polymer.

Walker assembly 10 may also be provided with a back support strap 701 comprising a fabric web 702, and first and second attachment ends 703 and 704. Attachment ends are fitted into corresponding mating brackets mounted on the upper ends 108 and 158 of first and second front support leg assemblies 100 and 150. In the embodiment depicted in FIGS. 2 and 3, mating brackets 738 and 788 are integrally formed as part of quick release mechanisms 736 and 738.

It is, therefore, apparent that there has been provided, in accordance with the present invention, a walker apparatus that is collapsible to a compact shape in a continuous collapsing motion. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A walker apparatus comprising:

a. a first front support leg assembly and a second front support leg assembly, each of said first front support leg assembly and said second front support leg assembly including:

i. an elongated member including a lower end, a central region, and an upper end;

ii. a lower front cross brace link; and iii. a triangulation link;

b. a first sliding joint comprising a body including a bore, a leg pivot link, an upper front cross brace link, and a central joint pivot link, wherein said central region of said elongated member of said first front support leg assembly is disposed within said bore of said first sliding joint, such that said first sliding joint is slidable along said central region of said elongated member of said first front support leg assembly;

c. a second sliding joint comprising a body including a bore, a leg pivot link, an upper front cross brace link, and a central joint pivot link, wherein said central region of said elongated member of said second front support leg assembly is disposed within said bore of said second sliding joint, such that said second sliding joint is slidable along said central region of said elongated member of said second front support leg assembly;

d. a central hinge joint comprising a first arm and a second arm, each of said first and second arms comprising an inner end, wherein said inner end of said first arm is hingably connected to said inner end of said second arm; and each of said first and second arms comprising an outer end including a pivot link, said pivot link of said first arm being pivotably connected to said central joint pivot link of said first sliding joint, and said pivot link of said second arm being pivotably connected to said central joint pivot link of said second sliding joint;

e. a first rear support leg assembly and a second rear support leg assembly, each of said first rear support leg assembly and said second rear support leg assembly comprising an elongated member including a lower end, a central region, and an upper end, wherein:
   i. each of said upper ends of said first rear support leg assembly and said second rear support leg assembly further comprises a pivot link, said pivot link of said first rear support leg assembly being pivotably connected to said leg pivot link of said first sliding joint, and said pivot link of said second rear support leg assembly being pivotably connected to said leg pivot link of said second sliding joint;
   ii. each central region of said first rear support leg assembly and said second rear support leg assembly further comprises a triangulation link and a lower rear cross brace link;

f. a first support member comprising a front end including a front link connected to said triangulation link of said first front support leg assembly, and a rear end including a rear link connected to said triangulation link of said first rear support leg assembly;

g. a second support member comprising a front end including a front link connected to said triangulation link of said second front support leg assembly, and a rear end including a rear link connected to said triangulation link of said second rear support leg assembly;

h. a front leg collapsing assembly comprising a first front cross brace and a second front cross brace, each of said first front cross brace and said second front cross brace comprising a lower end, a central pivot connection region, and an upper end, wherein:
   i. each of said upper ends of said first front cross brace and said second front cross brace further comprises an upper pivot link, said upper pivot link of said first front cross brace being pivotably connected to said upper front cross brace link of said first sliding joint, and said upper pivot link of said second front cross brace being pivotably connected to said upper front cross brace link of said second sliding joint;
   ii. each of said lower ends of said first front cross brace and said second front cross brace further comprises a lower pivot link, said lower pivot link of said first front cross brace being pivotably connected to said lower front cross brace link of said second front support leg assembly, and said lower pivot link of said second front cross brace being pivotably connected to said lower front cross brace link of said first front support leg assembly; and
   iii. said central pivot connection region of said first front cross brace is pivotably connected to said central pivot connection region of said second front cross brace;

i. a rear leg collapsing assembly comprising a first rear cross brace and a second rear cross brace, each of said first rear cross brace and said second rear cross brace comprising a lower end, a central pivot connection region, and an upper end, wherein:
   i. each of said upper ends of said first rear cross brace and said second rear cross brace comprises an upper universal joint, said upper universal joint of said first rear cross brace being connected to said first arm of said central hinge joint, and said upper universal joint of said second rear cross brace being connected to said second arm of said central hinge joint;
   ii. each of said lower ends of said first rear cross brace and said second rear cross brace further comprises a lower pivot link, said lower pivot link of said first rear cross brace being pivotably connected to said lower rear cross brace link of said second rear support leg assembly, and said lower pivot link of said second rear cross brace being pivotably connected to said lower rear cross brace link of said first rear support leg assembly; and
   iii. said central pivot connection region of said first rear cross brace is pivotably connected to said central pivot connection region of said second rear cross brace.

2. The walker apparatus as recited in claim 1, wherein said central hinge joint is a locking hinge joint deployable from a closed position to an open position, and wherein said central hinge joint is lockable in the open position, thereby enabling the locking of said walker apparatus in an open position.

3. The walker apparatus as recited in claim 2, wherein said central hinge joint further comprises:

a. a first arm comprising an inner end comprised of a first housing half including a first gear socket;

b. a second arm comprising an inner end comprised of a second housing half including a second gear socket, said first housing half pivotably joined to said second housing half, and said first gear socket and said second gear socket forming a cavity;

c. a gear disposed in said cavity and including at least one gear tooth that is engagable with said first housing half and said second housing half to lock said central hinge joint in the open position.

4. The walker apparatus as recited in claim 3, wherein said central hinge joint further comprises a spring disposed between said gear and said first housing half, and a button in contact with said gear.

5. The walker apparatus as recited in claim 3, wherein said central hinge joint further comprises a first socket formed in said first housing half, and a second socket formed in said second housing half.

6. The walker apparatus as recited in claim 3, wherein said central hinge joint further comprises a first boss formed in said first housing half for attachment to said upper universal joint of said first rear cross brace, and a second boss formed in said second housing half for attachment to said upper universal joint of said second rear cross brace.

7. The walker apparatus as recited in claim 3, wherein said central hinge joint is in said open position.

8. The walker apparatus as recited in claim 3, wherein said central hinge joint is in a closed position.

9. The walker apparatus as recited in claim 3, wherein said walker apparatus is collapsible from an open state to a collapsed state in a single continuous motion by moving said central hinge joint from said open position to a closed position.

10. The walker apparatus as recited in claim 1, further comprising a seat assembly joined to said first sliding joint and said second sliding joint.

11. The walker apparatus as recited in claim 10, wherein said seat assembly is pivotably joined to said first sliding joint and said second sliding joint.

12. The walker apparatus as recited in claim 11, wherein said seat assembly comprises a first seat arm pivotably joined to said first sliding joint, a second seat arm pivotably joined to said second sliding joint, and a fabric web joined to said first seat arm and said second seat arm.

13. The walker apparatus as recited in claim 10, wherein said first sliding joint further comprises a first support hook adapted for receiving and supporting said first seat arm, and said second sliding joint further comprises a second support hook adapted for receiving and supporting said second seat arm.

14. The walker apparatus as recited in claim 13, wherein said first support hook is integrally formed with said first sliding joint, and said second support hook is integrally formed with said second sliding joint.

15. The walker apparatus as recited in claim 10, further comprising a back support strap including a first end attached to said upper end of said elongated member of said first front support leg assembly, and a second end attached to said upper end of said elongated member of said second front support leg assembly.

16. The walker apparatus as recited in claim 15, wherein said back support strap is comprised of a fabric web.

17. The walker apparatus as recited in claim 1, further comprising a first caster operatively connected to said lower end of said elongated member of said first front support leg assembly, and a second caster operatively connected to said lower end of said elongated member of said second front support leg assembly.

18. The walker apparatus as recited in claim 17, further comprising a first wheel assembly operatively connected to said lower end of said elongated member of said first rear support leg assembly, and a second wheel assembly operatively connected to said lower end of said elongated member of said second rear support leg assembly.

19. The walker apparatus as recited in claim 18, wherein said first rear wheel assembly further comprises a first brake assembly, and said second rear wheel assembly further comprises a second brake assembly.

20. The walker apparatus as recited in claim 19, further comprising a first handlebar assembly connected to said upper end of said elongated member of said first front support leg assembly, and a second handlebar assembly connected to said upper end of said elongated member of said second front support leg assembly, wherein said first handlebar assembly further comprises a first hand actuator operatively connected to said first brake assembly, and said second handlebar assembly further comprises a second hand actuator operatively connected to said second brake assembly.

* * * * *